United States Patent
Lee et al.

(10) Patent No.: US 10,312,696 B2
(45) Date of Patent: Jun. 4, 2019

(54) METHOD AND APPARATUS FOR TRANSMITTING WIRELESS POWER

(71) Applicant: Samsung Electronics Co., Ltd., Gyeonggi-do (KR)

(72) Inventors: Kyung-Woo Lee, Seoul (KR); Kang-Ho Byun, Gyeonggi-do (KR); Se-Ho Park, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 51 days.

(21) Appl. No.: 15/707,434

(22) Filed: Sep. 18, 2017

(65) Prior Publication Data
US 2018/0006467 A1    Jan. 4, 2018

Related U.S. Application Data

(60) Continuation of application No. 14/624,329, filed on Feb. 17, 2015, now Pat. No. 9,768,621, which is a (Continued)

(30) Foreign Application Priority Data

Oct. 4, 2012    (KR) .................. 10-2012-0110008

(51) Int. Cl.
*H02J 7/00*    (2006.01)
*H02J 50/00*    (2016.01)
(Continued)

(52) U.S. Cl.
CPC ............ *H02J 5/005* (2013.01); *H02J 7/0044* (2013.01); *H02J 7/025* (2013.01); *H02J 17/00* (2013.01);
(Continued)

(58) Field of Classification Search
CPC .. H02J 5/005; H02J 50/80; H02J 50/90; H02J 50/10; H02J 50/12; H02J 50/40;
(Continued)

(56) References Cited

U.S. PATENT DOCUMENTS

| 7,916,467 | B2 | 3/2011 | Hotelling et al. |
| 8,416,721 | B1 | 4/2013 | Chen |

(Continued)

FOREIGN PATENT DOCUMENTS

| CN | 201887527 | 6/2011 |
| JP | 2010-183704 | 8/2010 |

(Continued)

OTHER PUBLICATIONS

Indian Examination Report dated Sep. 10, 2018 issued in counterpart application No. 1417/KOLN/2014, 6 pages.

(Continued)

*Primary Examiner* — Stacy Whitmore
(74) *Attorney, Agent, or Firm* — The Farrell Law Firm, P.C.

(57) ABSTRACT

A method and apparatus are provided for controlling wireless power in a wireless power network managed by a wireless power transmitter. The control method includes registering a wireless power receiver to a wireless power network corresponding to the wireless power transmitter; applying a charging power for charging the wireless power receiver to a resonator of the wireless power transmitter; detecting a change of magnitude of power applied to the resonator; detecting that a communication unit of the wireless power transmitter fails to receive a communication signal from the wireless power receiver a predetermined time; and in response to detecting the change of the magnitude of power applied to the resonator and that the communication unit fails to receive the communication (Continued)

signal from the wireless power receiver in the predetermined time, removing the wireless power receiver from the wireless power network.

6 Claims, 23 Drawing Sheets

Related U.S. Application Data division of application No. 13/717,290, filed on Dec. 17, 2012, now Pat. No. 9,711,969.

(60) Provisional application No. 61/576,050, filed on Dec. 15, 2011.

(51) Int. Cl.
| | | |
|---|---|---|
| *H02J 5/00* | (2016.01) | |
| *H02J 50/80* | (2016.01) | |
| *H02J 50/12* | (2016.01) | |
| *H02J 50/90* | (2016.01) | |
| *H02J 50/60* | (2016.01) | |
| *H02J 50/40* | (2016.01) | |
| *H02J 50/10* | (2016.01) | |
| *H02J 7/02* | (2016.01) | |
| *H02J 17/00* | (2006.01) | |
| *H04B 5/00* | (2006.01) | |
| *H04W 52/02* | (2009.01) | |

(52) U.S. Cl.
CPC .............. *H02J 50/10* (2016.02); *H02J 50/12* (2016.02); *H02J 50/40* (2016.02); *H02J 50/60* (2016.02); *H02J 50/80* (2016.02); *H02J 50/90* (2016.02); *H04B 5/0037* (2013.01); *H04W 52/0225* (2013.01); *H04W 52/0229* (2013.01); *H04W 52/0245* (2013.01); *Y02D 70/00* (2018.01)

(58) Field of Classification Search
CPC .......... H02J 50/60; H02J 7/0044; H02J 17/00; H02J 7/025; H01F 38/14; H04B 5/0037
See application file for complete search history.

(56) References Cited

U.S. PATENT DOCUMENTS

| | | |
|---|---|---|
| 8,781,434 B2 | 7/2014 | Chen |
| 8,796,999 B2 | 8/2014 | Toncich et al. |
| 9,130,407 B2 | 9/2015 | Tonich |
| 9,185,702 B2 | 11/2015 | Sugaya |
| 2004/0145342 A1 | 7/2004 | Lyon |
| 2007/0002734 A1 | 1/2007 | Kim et al. |
| 2007/0115972 A1 | 5/2007 | Jang et al. |
| 2008/0197804 A1 | 8/2008 | Onishi et al. |
| 2008/0232287 A1 | 9/2008 | Shao et al. |
| 2009/0108679 A1 | 4/2009 | Porwal |
| 2009/0122774 A1 | 5/2009 | Seok et al. |
| 2009/0212736 A1 | 8/2009 | Baarman et al. |
| 2009/0286475 A1 | 11/2009 | Toncich |
| 2010/0142423 A1 | 6/2010 | Zhu et al. |
| 2010/0151808 A1 | 6/2010 | Toncich et al. |
| 2010/0171461 A1 | 7/2010 | Baarman et al. |
| 2010/0181961 A1 | 7/2010 | Novak |
| 2010/0194206 A1 | 8/2010 | Burdo et al. |
| 2010/0194335 A1 | 8/2010 | Kirby et al. |
| 2010/0201312 A1 | 8/2010 | Kirby et al. |
| 2010/0201314 A1 | 8/2010 | Toncich et al. |
| 2010/0207575 A1 | 8/2010 | Pijnenburg et al. |
| 2010/0225272 A1 | 9/2010 | Kirby et al. |
| 2010/0248622 A1 | 9/2010 | Lyell Kirby et al. |
| 2010/0253281 A1 | 10/2010 | Li |
| 2011/0043163 A1 | 2/2011 | Baarman |
| 2011/0050164 A1 | 3/2011 | Partovi et al. |
| 2011/0127843 A1 | 6/2011 | Karaoguz et al. |
| 2011/0127953 A1 | 6/2011 | Walley et al. |
| 2011/0148349 A1 | 6/2011 | Kim et al. |
| 2011/0184582 A1 | 7/2011 | Jang et al. |
| 2011/0225073 A1 | 9/2011 | Won et al. |
| 2011/0244913 A1 | 10/2011 | Kim et al. |
| 2011/0260682 A1 | 10/2011 | Low |
| 2012/0133324 A1 | 5/2012 | Baarman et al. |
| 2012/0223589 A1 | 9/2012 | Low et al. |
| 2012/0235636 A1 | 9/2012 | Partovi |
| 2012/0242284 A1 | 9/2012 | Wheatley et al. |
| 2012/0267960 A1 | 10/2012 | Low et al. |
| 2012/0299542 A1 | 11/2012 | Perry |
| 2013/0049683 A1 | 2/2013 | Farkas |
| 2013/0063082 A1 | 3/2013 | Lee et al. |
| 2013/0119924 A1 | 5/2013 | Kasturi et al. |
| 2013/0154560 A1 | 6/2013 | Walley et al. |
| 2013/0264997 A1 | 10/2013 | Lee et al. |
| 2013/0285604 A1 | 10/2013 | Partovi |
| 2013/0285605 A1 | 10/2013 | Partovi |
| 2013/0293190 A1 | 11/2013 | Pijnenburg et al. |
| 2013/0300358 A1 | 11/2013 | Kirby et al. |
| 2014/0015478 A1 | 1/2014 | Von Novak |
| 2014/0028089 A1 | 1/2014 | Luke et al. |
| 2014/0062395 A1 | 3/2014 | Kwon et al. |
| 2014/0197783 A1 | 7/2014 | Kim et al. |
| 2014/0197785 A1 | 7/2014 | Lee et al. |
| 2014/0225560 A1 | 8/2014 | Walley et al. |
| 2014/0252873 A1 | 9/2014 | Irish et al. |
| 2014/0327409 A1 | 11/2014 | Lee et al. |
| 2014/0340036 A1 | 11/2014 | Toncich et al. |
| 2014/0348054 A1 | 11/2014 | Gaines et al. |
| 2014/0361741 A1 | 12/2014 | Von Novak et al. |
| 2015/0054353 A1 | 2/2015 | Low |
| 2015/0095401 A1 | 4/2015 | Blackstock et al. |
| 2015/0115885 A1 | 4/2015 | Carobolante |
| 2016/0241088 A1 | 8/2016 | Stevens et al. |

FOREIGN PATENT DOCUMENTS

| | | |
|---|---|---|
| JP | 2012-514971 | 6/2012 |
| JP | 2012-522483 | 9/2012 |
| KR | 10-0748094 | 8/2007 |
| KR | 1020100069979 | 6/2010 |
| KR | 1020110069264 | 6/2011 |
| KR | 10-2011-0110987 | 10/2011 |
| WO | WO 2009/050624 | 4/2009 |
| WO | WO 2010/117665 | 10/2010 |
| WO | WO 2011/112010 | 9/2011 |

OTHER PUBLICATIONS

Korean Office Action dated Jul. 30, 2018 dated in counterpart application No. 10-2012-0109999, 9 pages.
Master Table of Contents & Compliance Requirements, Specification of the Bluetooth System, Covered Core Package version: 4.0, Specification vols. 0-6, Jun. 30, 2010.
Chinese Office Action dated Jan. 13, 2017 issued in counterpart application No. 201280061068.X, 27 pages.
U.S. Office Action dated Mar. 10, 2016 issued in counterpart U.S. Appl. No. 13/717,290, 21 pages.
Chinese Office Action dated Jul. 5, 2016 issued in counterpart application No. 201280061068.X, 13 pages.
European Search Report dated May 6, 2015 issued in counterpart application No. 12858546.0-1804.
Chinese Office Action dated Oct. 28, 2015 issued in counterpart application No. 201280061068.X, 16 pages.
Japanese Office Action dated Oct. 31, 2016 issued in counterpart application No. 2014-547112, 6 pages.
U.S. Office Action dated Jan. 25, 2017 issued in counterpart U.S. Appl. No. 14/624,329, 27 pages.
Japanese Office Action dated Apr. 9, 2018 issued in counterpart application No. 2017-121509, 8 pages.

| Session ID | company ID | Product id | Load Character-istic | Current Character-istic | Voltage Character-istic | efficiency Character-istic | status Characteristic | input voltage | output voltage | output current |
|---|---|---|---|---|---|---|---|---|---|---|
| 1 | 0x1111 1111 | 0x1111 1111 | 25 | 300mA | 5V | 75% | complete & standby | - | 5V | 300mA |
| 2 | 0x2222 2222 | 0x1111 1111 | 30 | 500mA | 3V | 70% | Charge(CV) | 3V | 3V | 400mA |
| 3 | 0x3333 3333 | 0x2222 2222 | 10 | 100mA | 5V | 80% | Charge(CC) | 5V | 5V | 100mA |
| 4 | 0x4444 4444 | 0x1111 1111 | 50 | 500mA | 5V | 75% | Charge(CC) | 5V | 5V | 500mA |
| 5 | 0x5555 5555 | 0x3333 3333 | 100 | 500mA | 12V | 75% | standby | - | 12V | 500mA |

FIG.18

METHOD AND APPARATUS FOR TRANSMITTING WIRELESS POWER

PRIORITY

This application is a Continuation application of U.S. Ser. No. 14/624,329, which was filed in the U.S. Patent and Trademark Office on Feb. 17, 2015, which is a Divisional application of U.S. Ser. No. 13/717,290, which was filed in the U.S. Patent and Trademark Office on Dec. 17, 2012, issued as U.S. Pat. No. 9,711,969 on Jul. 18, 2017, and claims priority under 35 U.S.C. § 119(e) to U.S. Provisional Patent Application Ser. No. 61/576,050, which was filed in the U.S. Patent and Trademark Office on Dec. 15, 2011, and under 35 U.S.C. § 119(a) to Korean Patent Application Serial No. 10-2012-0110008, which was filed in the Korean Intellectual Property Office on Oct. 4, 2012, the entire disclosure of each of which is incorporated herein by reference.

BACKGROUND OF THE INVENTION

1. Field of the Invention

The present invention relates generally to a method and apparatus for transmitting wireless power, and more particularly, to method and apparatus for transmitting wireless power to multiple wireless power receivers.

2. Description of the Related Art

Recently, wireless or non-contact charging technologies have been developed, which are now widely used for a variety of electronic devices, such as wireless electric toothbrushes or wireless electric shavers.

Using wireless charging technology, which is based on wireless power transmission and reception, a battery of an electronic device, such as a mobile phone, may be automatically recharged if, for example, a user simply places the mobile phone on a charging pad without connecting a separate charging connector to the mobile phone.

Wireless charging technologies may be roughly classified into a coil-based electromagnetic induction scheme, a resonant scheme, and a Radio Frequency (RF)/microwave radiation scheme, which delivers electrical energy by converting it into microwaves.

Although the electromagnetic induction scheme has been used more often, recently, experiments using an RF/microwave radiation scheme have been successful. Thus, it is expected that in the near future, more types of electronic products will be recharged wirelessly.

The electromagnetic induction-based power transmission transmits power between a primary coil and a secondary coil. For example, an induced current occurs, when a magnet is moved around a coil. Using this principle, a transmitter generates a magnetic field, and in a receiver, a current is induced depending on a change in magnetic field, thereby producing energy. This power transmission method has excellent energy transmission efficiency.

As for the resonant scheme, power can be wirelessly transferred to an electronic device by using the Coupled Mode Theory, even though the electronic device is located several meters away from a charging device. The resonant scheme is based on a physics concept, wherein if a tuning fork rings, a nearby wine glass may also ring at the same frequency. However, the resonant scheme resonates electromagnetic waves containing electrical energy, instead of resonating sounds. The resonated electrical energy is directly delivered only to devices having the same resonant frequency, and any unused portion is reabsorbed as electromagnetic fields instead of being spread into the air. Thus, unlike other electromagnetic waves, the resonated electrical energy should not affect adjacent devices and a human body.

Although wireless charging schemes are garnering a great deal of attention and research, no standard has been proposed for the priority of wireless charging, a search for a wireless power transmitter and receiver, a selection of a communication frequency between the wireless power transmitter and receiver, an adjustment of wireless power, a selection of matching circuits, and a distribution of communication time for each wireless power receiver in one charging cycle. In particular, a standard is required for a wireless power transmitter to determine addition and removal of a wireless power receiver to and from a wireless power network managed by the wireless power transmitter.

SUMMARY OF THE INVENTION

Accordingly, the present invention is designed to address at least the problems and/or disadvantages described above and to provide at least the advantages described below.

An aspect of the present invention is to provide a standard for the overall operation of a wireless power transmitter and a wireless power transmitter receiver.

Another aspect of the present invention is to provide a wireless power transmitter and method for determining addition and removal of a wireless power receiver to and from a wireless power network managed by the wireless power transmitter.

In accordance with an aspect of the present invention, a wireless power transmitter is provided, which includes a resonator; a communication device; and a processor configured to register a wireless power receiver to a wireless power network corresponding to the wireless power transmitter, control such that a charging power for charging the wireless power receiver is applied to the resonator, detect a change of magnitude of power applied to the resonator, detect that the communication unit fails to receive a communication signal from the wireless power receiver in a predetermined time, and in response to detecting the change of the magnitude of the power applied to the resonator and that the communication unit fails to receive the communication signal from the wireless power receiver in the predetermined time, remove the wireless power receiver from the wireless power network.

In accordance with another aspect of the present invention, a control method of a wireless power transmitter is provided, which includes registering a wireless power receiver to a wireless power network corresponding to the wireless power transmitter; applying a charging power for charging the wireless power receiver to a resonator of the wireless power transmitter; detecting a change of magnitude of power applied to the resonator; detecting that a communication unit of the wireless power transmitter fails to receive a communication signal from the wireless power receiver a predetermined time; and in response to detecting the change of the magnitude of power applied to the resonator and that the communication unit fails to receive the communication signal from the wireless power receiver in the predetermined time, removing the wireless power receiver from the wireless power network.

BRIEF DESCRIPTION OF THE DRAWINGS

The above and other aspects, features, and advantages of certain embodiments of the present invention will be more apparent from the following description taken in conjunction with the accompanying drawings, in which:

FIG. 18 illustrates an example of a device control table according to an embodiment of the present invention.

Throughout the drawings, the same drawing reference numerals will be understood to refer to the same elements, features and structures.

DETAILED DESCRIPTION OF EMBODIMENTS OF THE PRESENT INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of present the invention. In addition, descriptions of well-known functions and constructions are omitted for clarity and conciseness.

Figure 1:
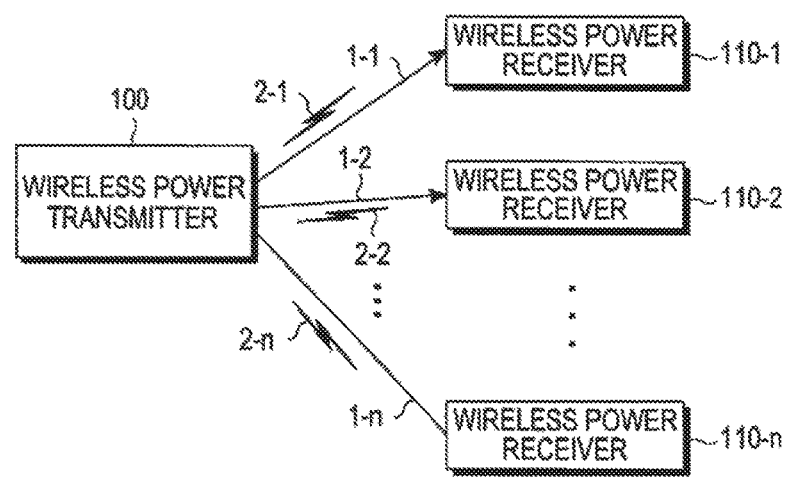
FIG. 1 illustrates a wireless charging system according to an embodiment of the present invention.

FIG. 1 illustrates a wireless charging system according to an embodiment of the present invention.

Referring to FIG. 1, the wireless charging system includes a wireless power transmitter 100 and wireless power receivers 110-1, 110-2, and 110-n. The wireless power transmitter 100 wirelessly transmits power 1-1, 1-2, and 1-n to the wireless power receivers 110-1, 110-2, and 110-n, respectively. More specifically, the wireless power transmitter 100 wirelessly transmits the power 1-1, 1-2, and 1-n only to the wireless power receivers that are authorized by performing a predetermined authentication procedure.

The wireless power transmitter 100 forms electrical connections with the wireless power receivers 110-1, 110-2 and 110-n. For example, the wireless power transmitter 100 transmits wireless power in the form of an electromagnetic wave to the wireless power receivers 110-1, 110-2, and 110-n.

Additionally, the wireless power transmitter 100 performs bi-directional communication with the wireless power receivers 110-1, 110-2, and 110-n. The wireless power transmitter 100 and the wireless power receivers 110-1, 110-2, and 110-n process and exchange packets 2-1, 2-2, and 2-n, each configured in a predetermined frame. The wireless power receivers 110-1, 110-2, and 110-n may be implemented as, for example, mobile communication terminals, Personal Digital Assistants (PDAs), a Personal Multimedia Players (PMPs), smart phones, etc.

The wireless power transmitter 100 wirelessly supplies power to the wireless power receivers 110-1, 110-2, and 110-n using the resonant scheme. When the wireless power transmitter 100 uses the resonant scheme, the distance between the wireless power transmitter 100 and the wireless power receivers 110-1, 110-2, and 110-n may be preferably 30 m or less. However, when the wireless power transmitter 100 uses the electromagnetic induction scheme, the distance between the wireless power transmitter 100 and the wireless power receivers 110-1, 110-2, and 110-n may be preferably 10 cm or less.

The wireless power receivers 110-1, 110-2, and 110-n charge a battery mounted therein by receiving wireless power from the wireless power transmitter 100. Further, the wireless power receivers 110-1, 110-2 and 110-n may transmit, to the wireless power transmitter 100, a signal requesting the transmission of the wireless power, information for receiving the wireless power, status information of the wireless power receiver, control information for the wireless power transmitter 100, etc.

The wireless power receivers 110-1, 110-2, and 110-n may send a message indicating their charging status to the wireless power transmitter 100.

The wireless power transmitter 100 may include a display that displays a status of each of the wireless power receivers 110-1, 110-2, and 110-n, based on the messages received from the wireless power receivers 110-1, 110-2, and 110-n. In addition, the wireless power transmitter 100 may display an estimated time remain until the wireless power receivers 110-1, 110-2, and 110-n will be fully charged.

Further, the wireless power transmitter 100 may transmit a control signal for disabling the wireless charging function of the wireless power receivers 110-1, 110-2, and 110-n. Basically, upon receiving the disable control signal for the wireless charging function from the wireless power transmitter 100, a wireless power receiver will disable the wireless charging function.

Figure 2A:
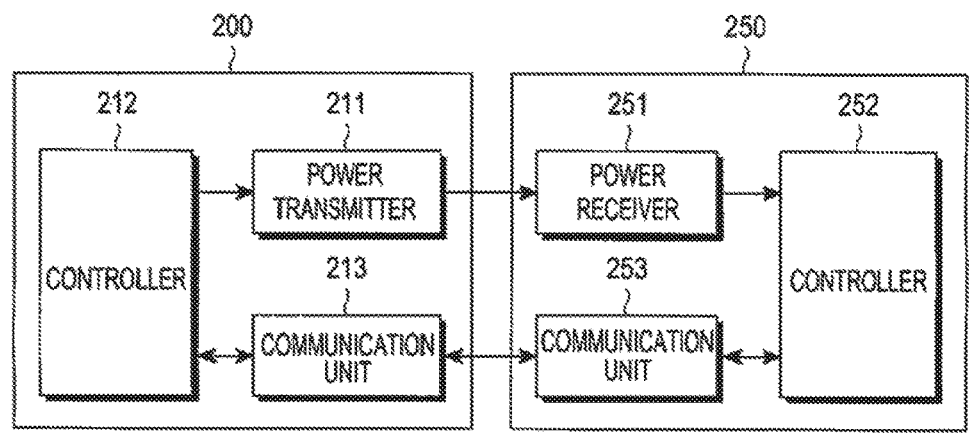
FIG. 2A is a block diagram illustrating a wireless power transmitter and a wireless power receiver according to an embodiment of the present invention.

FIG. 2A is a block diagram illustrating a wireless power transmitter and a wireless power receiver according to an embodiment of the present invention.

Referring to FIG. 2A, the wireless power transmitter 200 includes a power transmitter 211, a controller 212, and a communication unit 213. The wireless power receiver 250 includes a power receiver 251, a controller 252, and a communication unit 253. Herein, the term "unit" refers to a hardware device or a combination of hardware and software.

The power transmitter 211 wirelessly supplies power to the wireless power receiver 250 via the power receiver 251. The power transmitter 211 supplies power in an Alternating Current (AC) waveform. However, when the power transmitter 211 receives power in a Direct Current (DC) waveform, e.g., from a battery, the power transmitter 211 supplies power in an AC waveform, after converting the DC waveform into the AC waveform using an inverter. The power transmitter 211 may be implemented as a built-in battery, or may be implemented as a power receiving interface, which receives power from an outside source, e.g., an outlet, and supplies it to other components. It will be understood by those of ordinary skill in the art that the power transmitter 211 has no limit as long as it is capable of supplying power in an AC waveform.

Additionally, the power transmitter 211 may provide AC waveforms to the wireless power receiver 250 in the form of an electromagnetic wave. Accordingly, the power transmitter 211 may also include an additional loop coil, so that it may transmit or receive predetermined electromagnetic waves. When the power transmitter 211 is implemented with a loop coil, an inductance L of the loop coil is subject to change. It will be understood by those of ordinary skill in the art that the power transmitter 211 has no limit as long as it is capable of transmitting and receiving electromagnetic waves.

The controller 212 controls the overall operation of the wireless power transmitter 200, e.g., using an algorithm, program, or application, which is read out from a memory (not shown). The controller 212 may be implemented as a Central Processing Unit (CPU), a microprocessor, a minicomputer, etc.

The communication unit 213 communicates with the communication unit 253 in the wireless power receiver 250 using Near Field Communication (NFC), Zigbee, Infrared Data Association (IrDA), Visible Light Communication (VLC), Bluetooth, Bluetooth Low Energy (BLE), etc. Additionally, the communication unit 213 may perform communication using the IEEE 802.15.4 Zigbee communication scheme or the BLE scheme. In addition, the communication unit 213 may use a Carrier Sense Multiple Access/Collision Avoidance (CSMA/CA) algorithm.

The communication unit 213 transmits signals associated with information about the wireless power transmitter 200. For example, the communication unit 213 may unicast, multicast, or broadcast the signals.

Table 1 below illustrates a data structure of a signal transmitted from the wireless power transmitter 200, e.g., at stated periods, according to an embodiment of the present invention.

TABLE 1

| frame type | protocol version | sequence number | network ID | RX to Report (schedule mask) | Reserved | Number of Rx |
|---|---|---|---|---|---|---|
| Notice | 4 bits | 1 Byte | 1 Byte | 1 Byte | 5 bits | 3 bits |

In Table 1, the 'frame type' field, which indicates a type of the signal, indicates that the signal is a Notice signal. Further, the 'protocol version' field, which indicates a type of a communication protocol, is allocated, e.g., 4 bits, and the 'sequence number' field, which indicates a sequential order of the signal, may be allocated, e.g., 1 byte. The sequence number increases, e.g., in response to a transmission/reception step of the signal.

The 'network ID' field, which indicates a network ID of the wireless power transmitter 200, may be allocated, e.g., 1 byte, and the 'Rx to Report (schedule mask)' field, which indicates wireless power receivers that will make a report to the wireless power transmitter 200, may be allocated, e.g., 1 byte.

Table 2 below illustrates an example of an 'Rx to Report (schedule mask)' field according to an embodiment of the present invention.

TABLE 2

| Rx to Report (schedule mask) | | | | | | | |
|---|---|---|---|---|---|---|---|
| Rx1 | Rx2 | Rx3 | Rx4 | Rx5 | Rx6 | Rx7 | Rx8 |
| 1 | 0 | 0 | 0 | 0 | 1 | 1 | 1 |

In Table 2, Rx1 to Rx8 correspond to first to eighth wireless power receivers, respectively. Based on Table 2, a wireless power receiver, whose schedule mask number is represented as '1', i.e., Rx1, Rx6, Rx7, and Rx8, may make a report.

In Table 1, the 'Reserved' field, which is reserved for future use, is allocated, e.g., 5 bits, and the 'Number of Rx' field, which indicates a number of wireless power receivers adjacent to the wireless power transmitter 200, is allocated, e.g., 3 bits.

The signal in the form of the frame in Table 1 may be implemented such that it is allocated to Wireless Power Transmission (WPT) in the IEEE 802.15.4 data structure.

Table 3 illustrates the IEEE 802.15.4 data structure.

TABLE 3

| Preamble | SFD | Frame Length | WPT | CRC16 |
| --- | --- | --- | --- | --- |

As shown in Table 3, the IEEE 802.15.4 data structure includes 'Preamble', 'Start Frame Delimiter (SFD)', 'Frame Length', 'WPT', and 'Cyclic Redundancy Check (CRC)16' fields. Further, the data structure shown in Table 1 may be included in the WPT field of Table 3.

The communication unit 213 receives power information from the wireless power receiver 250. The power information may include at least one of a capacity of the wireless power receiver 250, a battery level, a charging count, usage, a battery capacity, and a battery percentage. The communication unit 213 transmits a charging function control signal for controlling the charging function of the wireless power receiver 250. For example, the charging function control signal may enable or disable the charging function by controlling the power receiver 251 in the specific wireless power receiver 250.

The communication unit 213 also receives signals from other wireless power transmitters (not shown). For example, the communication unit 213 may receive a Notice signal in the form of Table 1 from another wireless power transmitter.

Although FIG. 2A illustrates the power transmitter 211 and the communication unit 213 in different hardware structures, the power transmitter 211 and the communication unit 213 may also be configured in a single hardware structure.

The wireless power transmitter 200 and the wireless power receiver 250 exchange various signals. In accordance with an embodiment of the present invention, using this capability, a charging process is provided by joining the wireless power receiver 250 to a wireless power network managed by the wireless power transmitter 200.

Figure 2B:
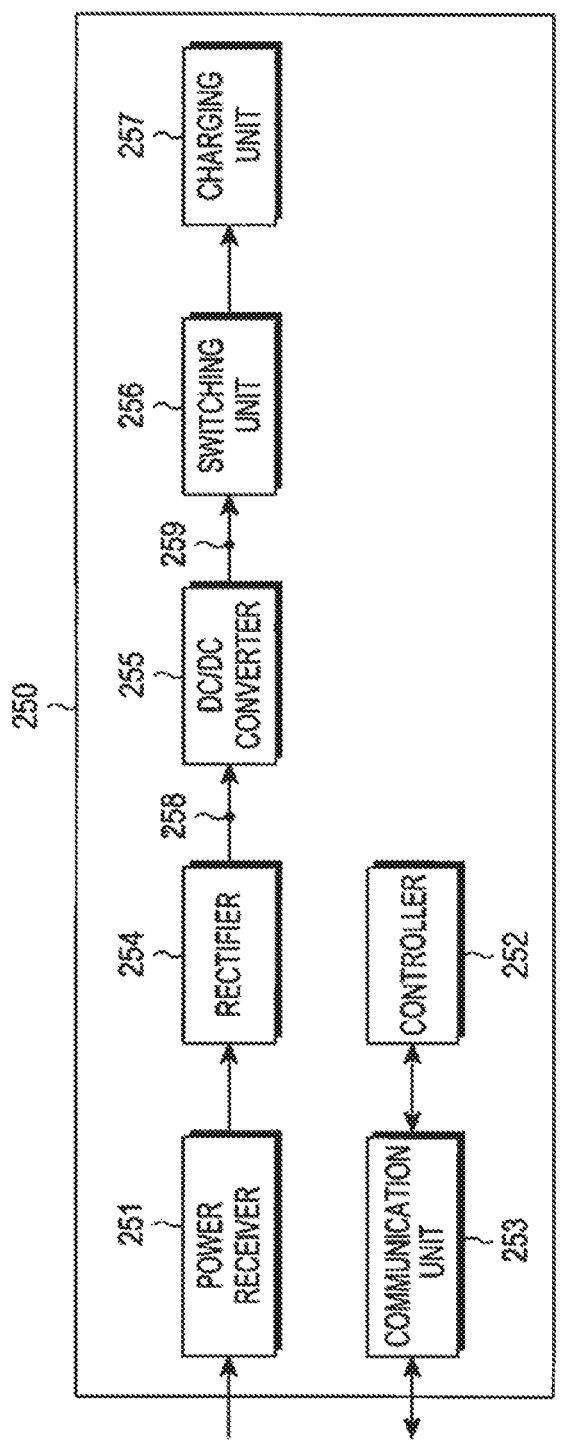
FIG. 2B is a block diagram illustrating a wireless power receiver according to an embodiment of the present invention.

FIG. 2B is a block diagram illustrating a wireless power receiver according to an embodiment of the present invention.

Referring to FIG. 2B, the wireless power receiver 250 includes a power receiver 251, a controller 252, a communication unit 253, a rectifier 254, a DC/DC converter 255, a switching unit 256, and a charging unit 257. Because a description of the power receiver 251, the controller 252, and the communication unit 253 has already been provided in relation to FIG. 2A, a repetitive description will be omitted here.

The rectifier 254, e.g., a bridge diode, rectifies the wireless power received from the power receiver 251 in the form of DC power. The DC/DC converter 255 converts the rectified power by a predetermined gain. For example, the DC/DC converter 255 converts the rectified power so that a voltage at its output terminal 259 is 5V. The possible minimum and maximum values of the voltage applied to a front end 258 of the DC/DC converter 255 may be set in advance, and information about these values may be recorded in an 'Input Voltage MIN' field and an 'Input Voltage MAX' field of a Request Join signal, respectively, as will be described in more detail below. In addition, a rated voltage value and a rated current value at the rear end 259 of the DC/DC converter 255 may be written in a 'Typical Output Voltage' field and a 'Typical Output Current' field of the Request Join signal.

The switching unit 256 connects the DC/DC converter 255 to the charging unit 257, under control of the controller 252. The charging unit 257 stores the converted power received from the DC/DC converter 255, if the switching unit 256 is in an on-state.

Figure 3:
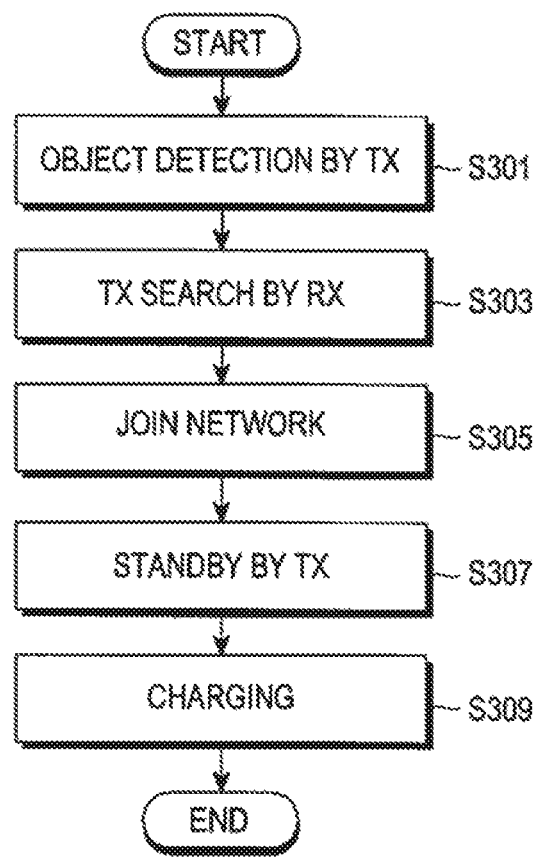
FIG. 3 is a flowchart illustrating a method in wireless power transmitter and receiver according to an embodiment of the present invention.

FIG. 3 is a flowchart illustrating a method in wireless power transmitter and receiver according to an embodiment of the present invention.

Referring to FIG. 3, the wireless power transmitter detects an object located near the wireless power transmitter in step S301. For example, upon detecting a change in load, the wireless power transmitter determines whether a new object is located near the wireless power transmitter. Alternatively, the wireless power transmitter may detect nearby objects based on voltage, current, phase, temperature, etc.

In step S303, the wireless power receiver searches for a wireless power transmitter from which it will receive wireless power in at least one channel. For example, the wireless power receiver transmits a wireless power transmitter search signal to at least one wireless power transmitter, and selects a wireless power transmitter from which it will receive wireless power, based on a wireless power transmitter search response signal received in response to the wireless power transmitter search signal. In addition, the wireless power receiver may form a communication network with the wireless power transmitter from which it will receive wireless power.

In step S305, the wireless power receiver joins the wireless power network managed by the wireless power transmitter from which it will receive wireless power. For example, the wireless power receiver transmits a join request signal (hereinafter referred to as a 'Request Join signal') to the wireless power transmitter from which it will receive wireless power, and in response, the wireless power receiver receives a join response signal (hereinafter referred to as a 'Response Join signal') from the wireless power transmitter. The Response Join signal may include join permission/prohibition information, which the wireless power receiver uses to determine whether joining the wireless power network managed by the wireless power transmitter is permitted or not.

In step S307, the wireless power receiver and the wireless power transmitter enter a standby state, wherein the wireless power transmitter may transmit a command signal to the wireless power receiver. The wireless power receiver transmits a report signal or an Acknowledgment (Ack) signal in response to the received command signal. If the command signal includes a charge start command, the wireless power receiver may start charging in step S309.

Figure 4A:
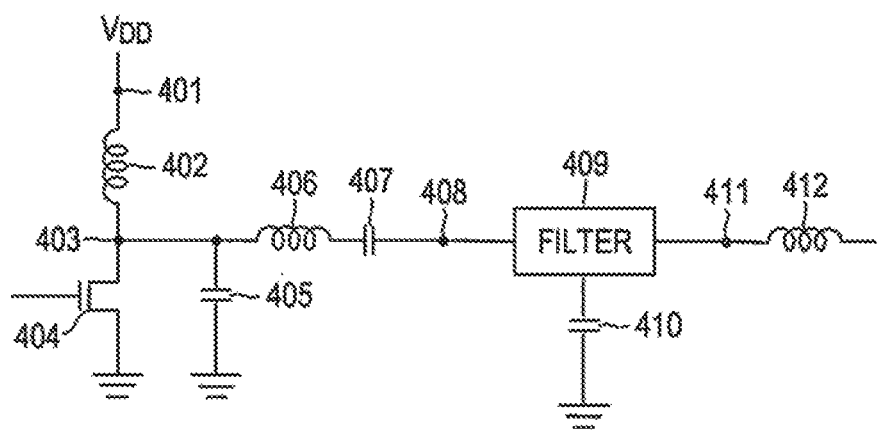
FIG. 4A is a circuit diagram illustrating a wireless power transmitter according to an embodiment of the present invention.

FIG. 4A is a circuit diagram illustrating a wireless power transmitter according to an embodiment of the present invention.

Referring to FIG. 4A, the wireless power transmitter includes an input terminal 401 receiving a driving voltage VDD. A first end of a coil 402 is connected to the input terminal 401, and a second end of the coil 402 is connected to a node 403, to which an end of a Field Effect Transistor (FET) element 404, an end of a coil 406, and an end of a capacitor 405 are connected. The other end of the FET element 404 is grounded. In addition, the other end of the capacitor 405 is also be grounded. The other end of the coil 406 is connected to a first end of a capacitor 407. A second end of the capacitor 407 is connected to a filter 409, which is connected to an end of a capacitor 410 and an end of a coil 412. The other end of the capacitor 410 is grounded.

The wireless power transmitter measures a load or impedance at the input terminal 401, in order to detect nearby objects. For example, if a new object is placed near the wireless power transmitter, an abrupt load change is detected. Thus, the wireless power transmitter determines that a new object is placed nearby.

Similarly, the wireless power transmitter measures a load or impedance at the input terminal 401, in order to detect an object moving away from the wireless power transmitter. For example, when the measured load abruptly decreases, the wireless power transmitter determines that an object previously placed nearby, has not moved away.

The wireless power transmitter detects the load at the input terminal 401, and also at a front end 408 or a rear end 411 of the filter 409. That is, the wireless power transmitter determines a new nearby object or the absence of an object by detecting the loads at various parts.

Alternatively, the wireless power transmitter may determine a new nearby object or the absence of an object based on a voltage value or a current value.

Figure 4B:
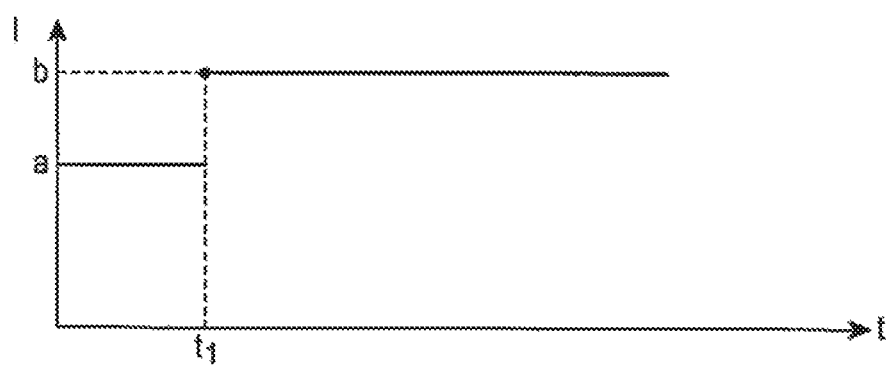
FIGS. 4B and 4C are graphs illustrating a current and a voltage, respectively, which are measured in the wireless power transmitter over the time, according to embodiments of the present invention.
Figure 4C:
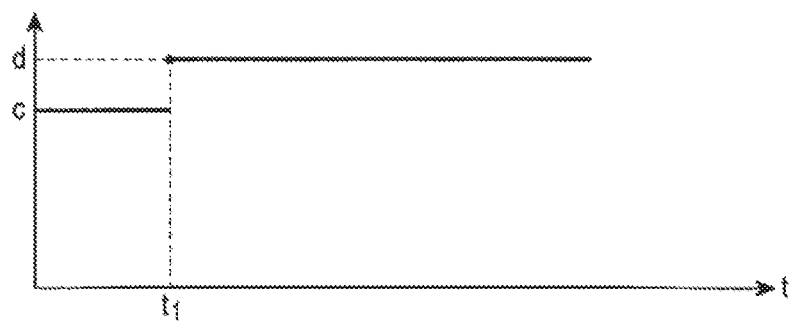

FIGS. 4B and 4C are graphs illustrating a current and a voltage, respectively, which are measured in the wireless power transmitter over the time, according to embodiments of the present invention.

In FIG. 4B, a current value measured at one point of the wireless power transmitter is 'a' from the start of the measuring until time t1. After the time t1, the measured current is 'b'. As can be understood from the graph of FIG. 4B, the current undergoes an abrupt change from 'a' to 'b' at time t1. Further, by detecting the abrupt change, the wireless power transmitter may determine a new nearby object or the absence of a previous nearby object.

In FIG. 4C, a voltage value measured at one point of the wireless power transmitter is 'c' from the start of the measuring until time t1. After t1, the measured voltage value is 'd'. As is apparent from the graph of FIG. 4C, the voltage value undergoes an abrupt change from 'c' to 'd' at time t1. Further, by detecting the abrupt change, the wireless power transmitter may determine a new nearby object or the absence of a previous nearby object.

Figure 4D:
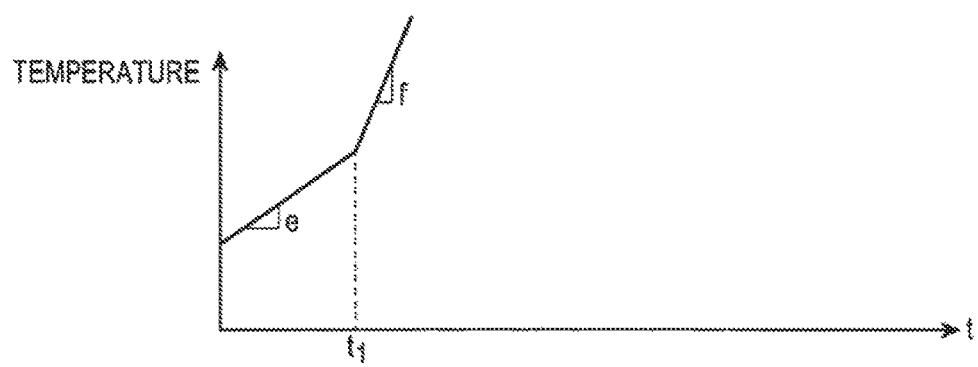
FIG. 4D is a graph illustrating a temperature measured at one point of a wireless power transmitter over the time, according to an embodiment of the present invention.

FIG. 4D is a graph illustrating a temperature measured at one point of a wireless power transmitter over the time, according to an embodiment of the present invention.

Referring to FIG. 4D, the temperature measured at one point of the wireless power transmitter linearly increases. Specifically, the temperature measured at one point of the wireless power transmitter increases with a slope of 'e' until a time t1. After time t1, the temperature increases with a slope of T. As can be understood from FIG. 4D, the slope for the increasing temperature undergoes an abrupt change from 'e' to 'f' at time t1. Further, by detecting the abrupt change, the wireless power transmitter may determine a new nearby object or the absence of a previous nearby object.

Figure 4E:
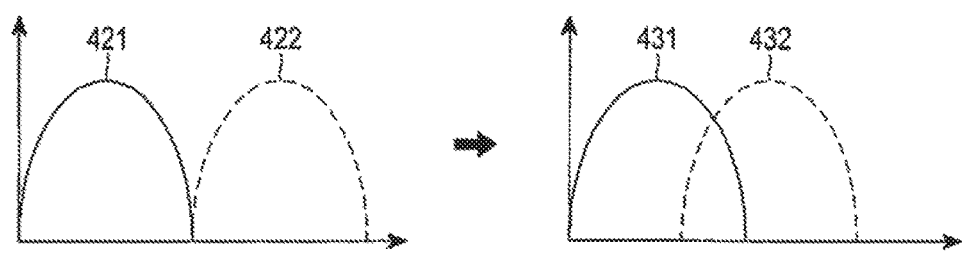
FIG. 4E is a graph illustrating a phase at one point of a wireless power transmitter according to an embodiment of the present invention.

FIG. 4E is a graph illustrating a phase at one point of a wireless power transmitter according to an embodiment of the present invention.

Referring to FIG. 4E, a voltage 421 and a current 422 at one point of the wireless power transmitter do not overlap until a specific time. After the specific time, the voltage 421 and the current 422 may partially overlap, as the phase at one point of the wireless power transmitter is changed. As the voltage 421 and the current 422 partially overlap, a power loss may occur. That is, the wireless power transmitter may detect an abrupt phase change by detecting the power loss. By detecting the abrupt change, the wireless power transmitter may determine a new nearby object or the absence of a previous nearby object.

In addition, the wireless power transmitter may determine the proximity of an object using an Infrared (IR) sensor or based on a user input.

Figure 5:
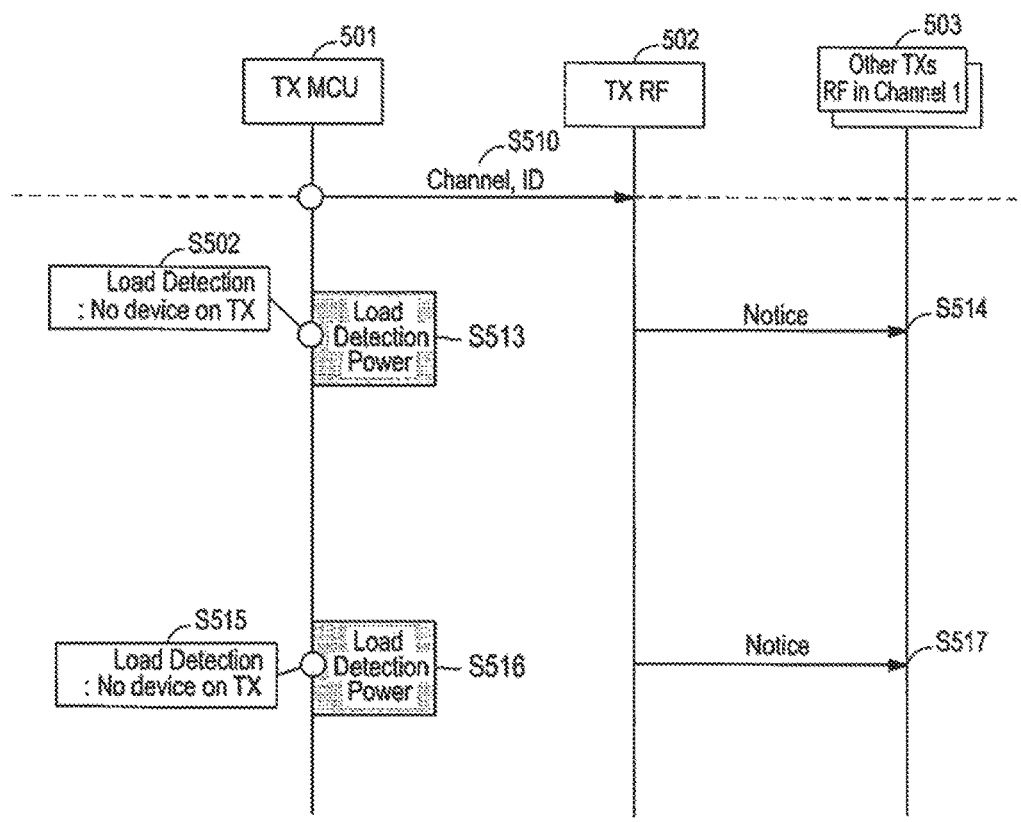
FIG. 5 is a timing diagram illustrating load detection and signal transmission in a wireless power transmitter according to an embodiment of the present invention.

FIG. 5 is a timing diagram illustrating load detection and signal transmission in a wireless power transmitter according to an embodiment of the present invention.

Referring to FIG. 5, a controller (TX MCU) 501 of the wireless power transmitter determines a channel on which it will perform communication, and a network ID in step S510. For example, the wireless power transmitter may set any one of IEEE 802.15.4 channels 11, 15, 20, and 24 as a communication channel. Further, the wireless power transmitter sets a network ID such that it does not duplicate that of another wireless power transmitter 503 in the communication channel.

The controller holds the detection state in steps S502 and S515, and transmits detection powers 513 and 516 for a valid detection period tdet at a stated detection period of stated detection periods of tdet_per.

Accordingly, the controller 501 may detect an object in step S511. The detection power and the size of the valid detection period are determined depending on the minimum power and time that the controller 501 uses to determine whether there is a candidate device for wireless charging within a valid range by detecting a change in a load value of its power transmitter, i.e., a resonator. That is, because the candidate device, i.e., a metal object, is detected from a change in load of the resonator, the controller 501 minimizes the power consumption in the detection state by periodically generating a sine wave with a low voltage, which has a size capable of detecting a load value of the resonator, for a short time required to detect the load value of the resonator. The detection state is maintained for the valid detection period until a new device is detected.

For example, if a wireless power receiver is placed on or over the wireless power transmitter, the controller 501 detects a change in load, and determines that an object is placed nearby the wireless power transmitter. For example, the controller 501 detects the abrupt change in load as illustrated in FIG. 4A, or detects an abrupt change in various other criteria as illustrated in FIGS. 4B to 4E.

In FIG. 5, it is assumed that the controller 501 has not detected an abrupt change. Accordingly, the controller 501 applies the detection powers 513 and 516 at stated detection periods, without changes in applied power.

In addition, a communication unit (TX RF) 502 transmits a Notice signal at stated periods in steps S514 and S517. For example, the Notice signal may have the data structure shown in Table 1 above.

Another wireless power transmitter 503 using the communication channel receives the Notice signal transmitted from the communication unit 502. The Notice signal, as described in conjunction with Table 1, may indicate a network ID of the wireless power transmitter, or indicate a schedule of the wireless power receiver that will perform communication with the wireless power transmitter. In addition, the Notice signal is transmitted at stated periods, e.g., every 270 ms, so it may be used as a synchronization signal.

Figure 6A:
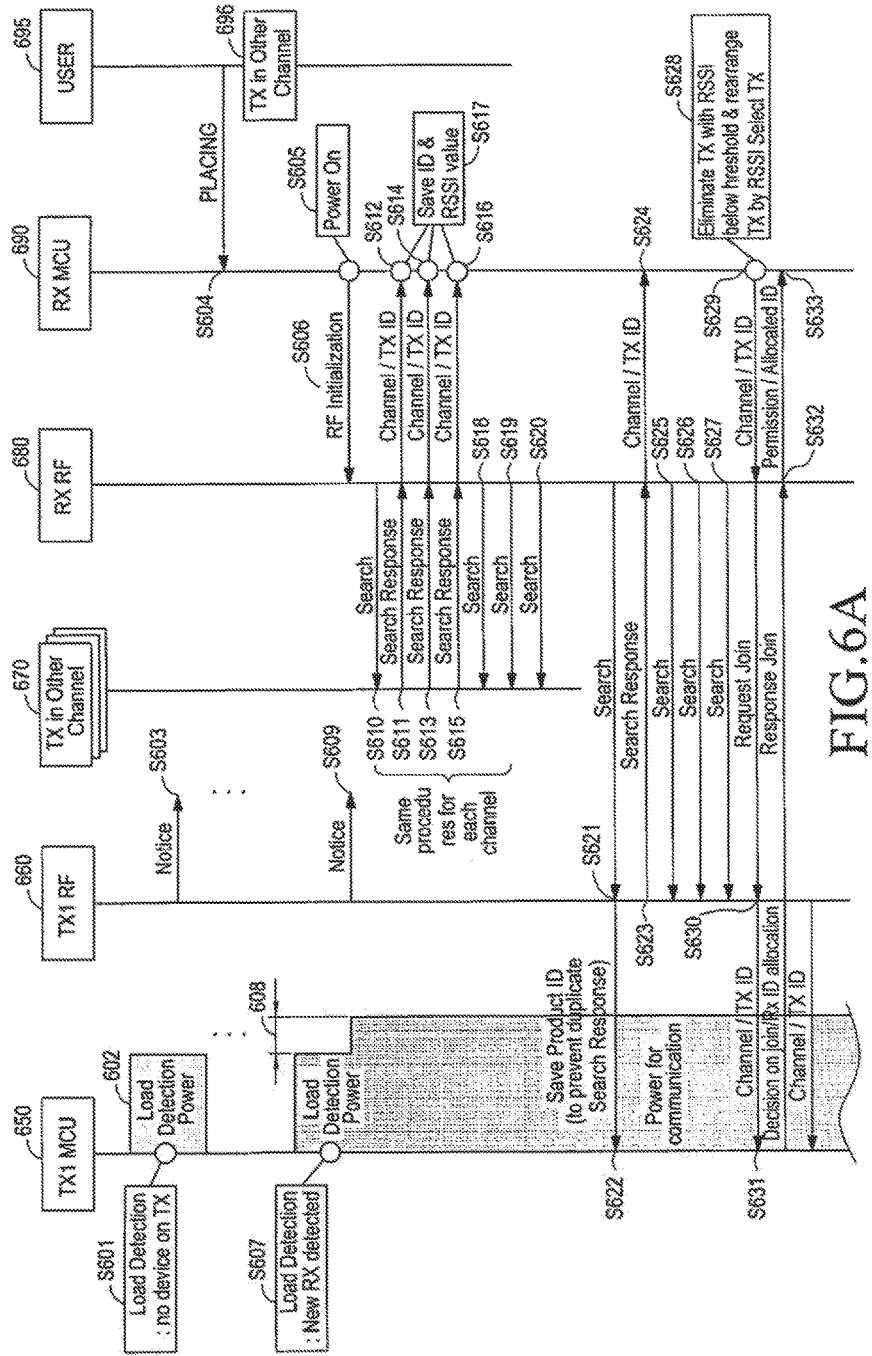
FIGS. 6A and 6B are timing diagrams illustrating a power supply operation between a wireless power transmitter and a wireless power receiver according to an embodiment of the present invention.
Figure 6B:
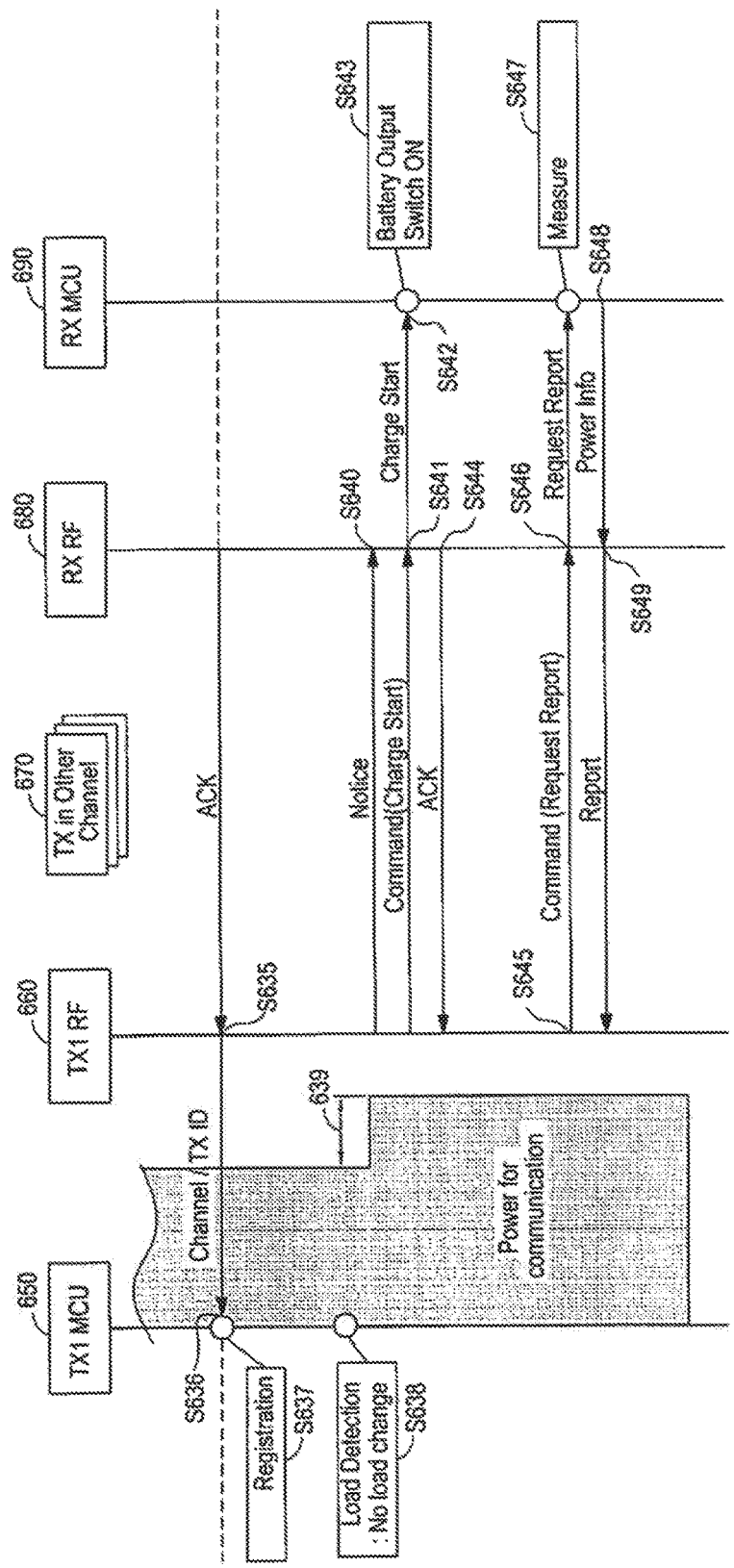

FIGS. 6A and 6B are timing diagrams illustrating a power supply operation between a wireless power transmitter and a wireless power receiver according to an embodiment of the present invention.

Referring to FIG. 6A, a controller 650 of a wireless power transmitter detects a change in load by applying detection power 602 at stated periods in step S601. In addition, a communication unit 660 transmits a Notice signal at stated periods in step S603. In FIG. 6A, the controller 650 of the wireless power transmitter does not detect an abrupt change in load in step S601.

In step S604, a user 695 places a wireless power receiver near the wireless power transmitter.

In step S607, the controller 650 re-applies detection power, after the preset period, and detects an abrupt change in load, caused by placing the receiver in step S604. If a device is detected within a valid detection period, the controller 650 applies driving power (or registration power) Preg, which is greater than the detection power 602 by a value 608. The driving power drives a controller 690 of the wireless power receiver.

Accordingly, the controller 690 is driven (or powered on) in step S605, and initializes a communication unit 680 in step S606. The controller 650 determines the presence of the wireless power receiver depending on the presence of a pulse initiated by the controller 690. The controller 650 may update the wireless power receiver, the presence of which is determined by the controller 650, in a device control table.

FIG. 18 illustrates an example of a device control table according to an embodiment of the present invention.

Referring to FIG. 18, the device control table is used to manage each wireless power receiver's session ID, company ID, product ID, load characteristic, current characteristic, voltage characteristic, efficiency characteristic, current status, a voltage at a front end of a DC/DC converter of the wireless power receiver, a voltage at a rear end of the DC/DC converter of the wireless power receiver, and a current at the rear end of the DC/DC converter of the wireless power receiver. The current status indicates whether the wireless power receiver is in the standby state after being fully charged, whether the wireless power receiver is in the standby state due to the lack of charging power, whether the wireless power receiver is being charged in a Constant Voltage (CV) mode, or whether the wireless power receiver is being charged in a Constant Current (CC) mode.

Referring again to FIG. 6A, the communication unit 680 uses a second channel under control of the controller 690. In the example of FIG. 6A, the second channel is used by another wireless power transmitter 670, and is different from the channel used by the communication unit 660. Accordingly, the channel used by the communication unit 660 will be referred to as "a first channel".

The order in which the controller 690 determines a search channel may be set in advance, e.g., using IEEE 802.15.4 channels 11, 24, 15 and 20. Further, the initial search channel searched by the controller 690 may be determined at random.

In step S610, the communication unit 680 transmits a wireless power transmitter search signal in the second channel. For example, the wireless power transmitter search signal, i.e., a Search signal, may have a data structure as shown in Table 4.

TABLE 4

| Frame Type | Protocol Version | Sequence Number | Company ID | Product ID | Impedance | Class |
|---|---|---|---|---|---|---|
| Search | 4 bit | 1 Byte | 1 Byte | 4 Byte | 4 bit | 4 bit |

In Table 4, 'frame type', which indicates a type of the signal, indicates that the signal is a Search signal. Further, the 'protocol version' field, which indicates a type of a communication protocol, is allocated, e.g., 4 bits, and the 'sequence number' field, which indicates a sequence order of the signal, is allocated, e.g., 1 byte. For example, the sequence number increases, for example, in response to a transmission/reception step of the signal. That is, if the sequence number of the Notice signal in Table 1 is 1, the sequence number of the Search signal in Table 4 is 2.

The 'Company ID' field, which indicates manufacturer information for the wireless power receiver, is allocated, e.g., 1 byte, the 'Product ID' field, which indicates product information for the wireless power receiver, e.g., serial number information of the wireless power receiver may be written in this field, is allocated, e.g., 4 bytes, the 'Impedance' field, which indicates impedance information for the wireless power receiver, is allocated, e.g., 4 bits, and the 'class' field, which indicates rated power information for the wireless power receiver, is allocated, e.g., 4 bits.

In FIG. 6A, three wireless power transmitters use the second channel, by way of example. In steps S611, S613, and S615, respectively, the three wireless power transmitters 670 transmit a wireless power transmitter search response signal to the communication unit 680, in response to the wireless power transmitter search signal.

The wireless power transmitter search response signal, i.e., a Response Search signal, may have a data structure as shown in Table 5.

TABLE 5

| Frame Type | Reserved | Sequence Number | Network ID |
|---|---|---|---|
| Response Search | 4 bit | 1 Byte | 1 Byte |

In Table 5, the 'frame type', which indicates a type of the signal, indicates that the signal is a Response Search signal. The 'Reserved' field, which is reserved for use, is allocated, e.g., 4 bits, and the 'sequence number' field, which indicates a sequential order of the signal, is allocated, e.g., 1 byte. The sequence number increases, for example, in response to a transmission/reception step of the signal. The 'network ID' field, which indicates a network ID of the wireless power transmitter, is allocated, e.g., 1 byte.

Based on the wireless power transmitter search response signal received on the second channel, the controller 690 identifies channel information and network ID information for each of the three wireless power transmitters 670 that use the second channel, in steps S612, S614, and S616. In addition, the controller 690 stores the identified channel information and network ID information, and Received Signal Strength Indication (RSSI) strength for each channel, in step S617.

In step S618, the communication unit 680 transmits a Search signal. Upon failure to receive a Search Response signal to the Search signal, the communication unit 680 transmits a Search signal twice more in steps S619 and S620. If the communication unit 680 fails to receive a Search Response signal to the Search signal, even after transmitting the Search signal three times, the controller 690 changes or switches the search channel to another channel.

In FIG. 6A, the controller 690 changes the search channel to the first channel, by way of example.

The communication unit 680 transmits a Search signal using the first channel in step S621. The communication unit 660 receives the Search signal, and the controller 650 updates the device control table illustrated in FIG. 18, based on the Search signal in step S622. In addition, the controller 650 generates a Search Response signal corresponding to the Search signal.

The communication unit 660 transmits the generated Search Response signal to the communication unit 680 in step S623.

Based on the Search Response signal received on the first channel, the controller 690 identifies channel information and network ID information of the wireless power transmitter that uses the first channel in step S624. In addition, the controller 690 may store the identified channel information and network ID information, and RSSI strength for each channel. The communication unit 680 transmits the Search signal three more times in steps S625, S626, and S627.

Thereafter, the wireless power receiver determines a communication channel on which it will perform communication, and a wireless power transmitter from which it will receive wireless power, in step S628. That is, based on the stored channel information and RSSI information, the wireless power receiver determines the communication channel and the wireless power transmitter from which it will receive wireless power. For example, the wireless power receiver may determine a channel with a minimum RSSI value as a communication channel. Thereafter, the communication unit 680 of the wireless power receiver forms a pairing with the communication unit 660.

Thereafter, the wireless power transmitter and receiver enter into a joined state. In step S629, the wireless power receiver generates a Request Join signal based on information about the determined communication channel and the determined wireless power transmitter from which it will receive wireless power. The communication unit 680 transmits the generated Request Join signal to the communication unit 660 in step S630.

For example, the Request Join signal has a data structure as shown in Table 6.

TABLE 6

| Frame Type | Reserved | Sequence Number | Network ID | Product ID | Input Voltage MIN | Input Voltage MAX | Typical Output Voltage | Typical Output Current |
|---|---|---|---|---|---|---|---|---|
| Request join | 4 bit | 1 Byte | 1 Byte | 4 Byte | 1 Byte | 1 Byte | 1 Byte | 1 Byte |

In Table 6, the 'frame type', which indicates a type of the signal, indicates that the signal is a Request Join signal. Additionally, the 'Reserved' field, which is reserved for future use, is allocated, e.g., 4 bits, and the 'sequence number' field, which indicates a sequential order of the signal, is allocated, e.g., 1 byte. The sequence number increases, for example, in response to a transmission/reception step of the signal.

The 'network ID' field, which indicates a network ID of the wireless power transmitter, is allocated, e.g., 1 byte, and the 'Product ID' field, which indicates product information for the wireless power receiver, e.g., serial number information of the wireless power receiver, is allocated, e.g., 4 bytes. The 'Input Voltage MIN' field, which indicates a minimum voltage value applied to a front end of a DC/DC inverter (not shown) of the wireless power receiver, is allocated, e.g., 1 byte, the 'Input Voltage MAX' field, which indicates a maximum voltage value applied to a rear end of the DC/DC inverter (not shown) of the wireless power receiver, is allocated, e.g., 1 byte, the 'Typical Output Voltage' field, which indicates a rated voltage value applied to the rear end of the DC/DC inverter (not shown) of the wireless power receiver, is allocated, for example, 1 byte, and the 'Typical Output Current' field, which indicates a rated current value applied to the rear end of the DC/DC inverter (not shown) of the wireless power receiver, is allocated, e.g., 1 byte.

Based on the received Request Join signal, in step S630, the controller 650 of the wireless power transmitter determines whether to join the wireless power receiver in the wireless power network. The controller 650 of the wireless power transmitter may determine whether to join the wireless power receiver in the wireless power network, based on the device control table illustrated in FIG. 18. For example, the wireless power transmitter may not permit the joining of the wireless power receiver, when the wireless power receiver requires a greater amount of power than an available amount of power that the wireless power transmitter may supply.

When the wireless power transmitter determines to join the wireless power receiver in the wireless power network, the controller 650 allocates a session ID to the wireless power receiver. The controller 650 generates a Response Join signal including the session ID or join permission/prohibition information. In step S632, the controller 650 controls the communication unit 660 to transmit the generated Response Join signal to the communication unit 680 of the wireless power receiver.

For example, the Response Join signal has a data structure as shown in Table 7.

TABLE 7

| Frame Type | Reserved | Sequence Number | Network ID | Permission | Session ID |
|---|---|---|---|---|---|
| Response join | 4 bit | 1 Byte | 1 Byte | 4 bit | 4 bit |

In Table 7, the 'frame type', which indicates a type of the signal, indicates that the signal is a Response Join signal. Additionally, the 'Reserved' field, which is reserved for future use, is allocated, e.g., 4 bits, and the 'sequence number' field, which indicates a sequential order of the signal, is allocated, e.g., 1 byte. The sequence number increases, for example, in response to a transmission/reception step of the signal.

The 'network ID' field, which indicates a network ID of the wireless power transmitter, is allocated, for example, 1 byte, and the 'Permission' field, which indicates whether the joining of the wireless power receiver in the wireless power network is permitted or prohibited, is allocated, e.g., 4 bits. For example, if the 'Permission' field indicates '1', it indicates that the wireless power receiver has permission to join, but if the 'Permission' field indicates '0', it indicates that the wireless power receiver is prohibited from the joining. The 'Session ID' field indicates a session ID that the wireless power transmitter allocates to the wireless power receiver, for control of the wireless power network. For example, the 'Session ID' is allocated 4 bits.

The communication unit 680 of the wireless power receiver may transmit the Request Join signal until it receives a Response Join signal from the communication unit 660 of the wireless power transmitter.

The controller 690 of the wireless power receiver determines whether it is permitted to join, by analyzing the received Response Join signal, and identifies the allocated session ID in step S633.

In step S635, the communication unit 680 transmits an Ack signal to the communication unit 660. The communication unit 660 may transmit the Response Join signal until it receives an Ack signal from the communication unit 680. In step S636, the controller 650 identifies the Ack signal with the channel and network ID, and registers the wireless power receiver in the wireless network in step S637. For example, the controller 660 manages the joined wireless power receiver using the device control table illustrated in FIG. 18.

In addition, the controller 660 may control the joined wireless power receiver to enter the standby state. For example, the controller 660 controls the wireless power receiver to stay in the standby state, if the charging of the wireless power receiver is completed, or if the transmit power is not sufficient to charge the capacity of the charging unit of the wireless power receiver.

In step S638, the controller determines that there is no change in load, by detecting the current load. In step S639, the controller 650 increases applied power to charging power for charging. The communication unit 660 of the wireless power transmitter transmits a Notice signal in step S640, indicating a wireless power receiver with which it will perform communication, among the wireless power receivers. The controller 660 of the wireless power transmitter indicates the wireless power receiver with which it will perform communication, using an Rx to Report (schedule mask) field of the Notice signal.

In step S641, the communication unit 660 transmits a command signal to start charging. Basically, a command signal, i.e., Command signal, indicates a command that the wireless power receiver is to carry out. For example, the Command signal may have a data structure as shown in Table 8.

TABLE 8

| Frame Type | Session ID | Sequence number | Network ID | command Type | Variable |
|---|---|---|---|---|---|
| Command | 4 bit | 1 Byte | 1 Byte | 4 bit | 4 bit |

In Table 8, the 'frame type', which indicates a type of the signal, indicates that the signal is a Command signal. The 'Session ID' field indicates a session ID that the wireless power transmitter allocates to each of wireless power receivers, for control of the wireless power network. For example, the 'Session ID' field is allocated 4 bits. The 'sequence number' field, which indicates a sequential order of the signal, is allocated, e.g., 1 byte. The sequence number increases, for example, in response to a transmission/reception step of the signal.

The 'network ID' field, which indicates a network ID of the wireless power transmitter, is allocated, e.g., 1 byte, the 'command Type' field, which indicates a type of the command, is allocated, e.g., 4 bits, and the 'Variable' field, which supplements the Command signal, is allocated, e.g., 4 bits.

The 'command Type' field and the 'Variable' field may have various examples as shown in Table 9.

TABLE 9

| command Type | Variable |
|---|---|
| Charge start | reserved |
| Charge finish | reserved |
| Request report | CTL level |
| Reset | Reset type |
| Channel scan | Reserved |
| Channel change | channel |

In Table 9, 'Charge start' is a command to instruct the wireless power receiver to start charging, 'Charge finish' is a command to instruct the wireless power receiver to finish charging, 'Request report' is a command to instruct the wireless power receiver to transmit a report signal, 'Reset' is an initialization command, Channel scan' is a command to scan channels, and 'Channel change' is a command to change a communication channel.

In step s642, the controller 690 of the wireless power receiver may start charging based on the Command signal. In step S643, the controller 690 of the wireless power receiver starts charging by turning on a switching unit between a DC/DC converter and a charging unit.

In step S644, the communication unit 680 transmits an Ack signal, and in step S645, the communication unit 660 transmits a Command signal to request a report. The Command signal is a Command signal with command Type=Request report.

Upon receiving the Command signal transmitted in step S646, the controller 690 measures the current power situation in step S647. In step S648, the controller 690 generates a Report signal including the current power situation information based on the measurement results. In step S649, the communication unit 680 transmits the generated Report signal to the communication unit 660.

The Report signal is a signal for reporting the current status of the wireless power receiver to the wireless power transmitter. For example, the Report signal may have a data structure as shown in Table 10.

TABLE 10

| Frame Type | Session ID | Sequence number | Network ID | Input Voltage | Output Voltage | Output Current | Reserved |
|---|---|---|---|---|---|---|---|
| Report | 4 bit | 1 Byte | 1 Byte | 1 Byte | 1 Byte | 1 Byte | 1 Byte |

In Table 10, the 'frame type' field, which indicates a type of the signal, indicates that the signal is a Report signal. The 'Session ID' field indicates a session ID that the wireless power transmitter allocates to the wireless power receiver, for control of the wireless power network. For example, the 'Session ID' field is allocated 4 bits.

Additionally, the 'sequence number' field, which indicates a sequential order of the signal, is allocated, e.g., 1 byte. The sequence number increases, for example, in response to a transmission/reception step of the signal.

The 'network ID' field, which indicates a network ID of the wireless power transmitter, is allocated, e.g., 1 byte, the 'Input Voltage' field, which indicates a voltage value applied to a front end of a DC/DC inverter (not shown) of the wireless power receiver, is allocated, e.g., 1 byte, the 'Output Voltage' field, which indicates a voltage value applied to a rear end of the DC/DC inverter (not shown) of the wireless power receiver, is allocated, e.g., 1 byte, and the 'Output Current' field, which indicates a rated current value applied to the rear end of the DC/DC inverter (not shown) of the wireless power receiver, is allocated, e.g., 1 byte.

The wireless power transmitter may transmit the Command signal until it receives a Report signal or an Ack signal from the wireless power receiver. If the wireless power transmitter fails to receive a Report signal or an Ack signal from a specific wireless power receiver for an allotted time, the wireless power transmitter may retransmit the Command signal to the specific wireless power receiver for an extra time.

Figure 7:
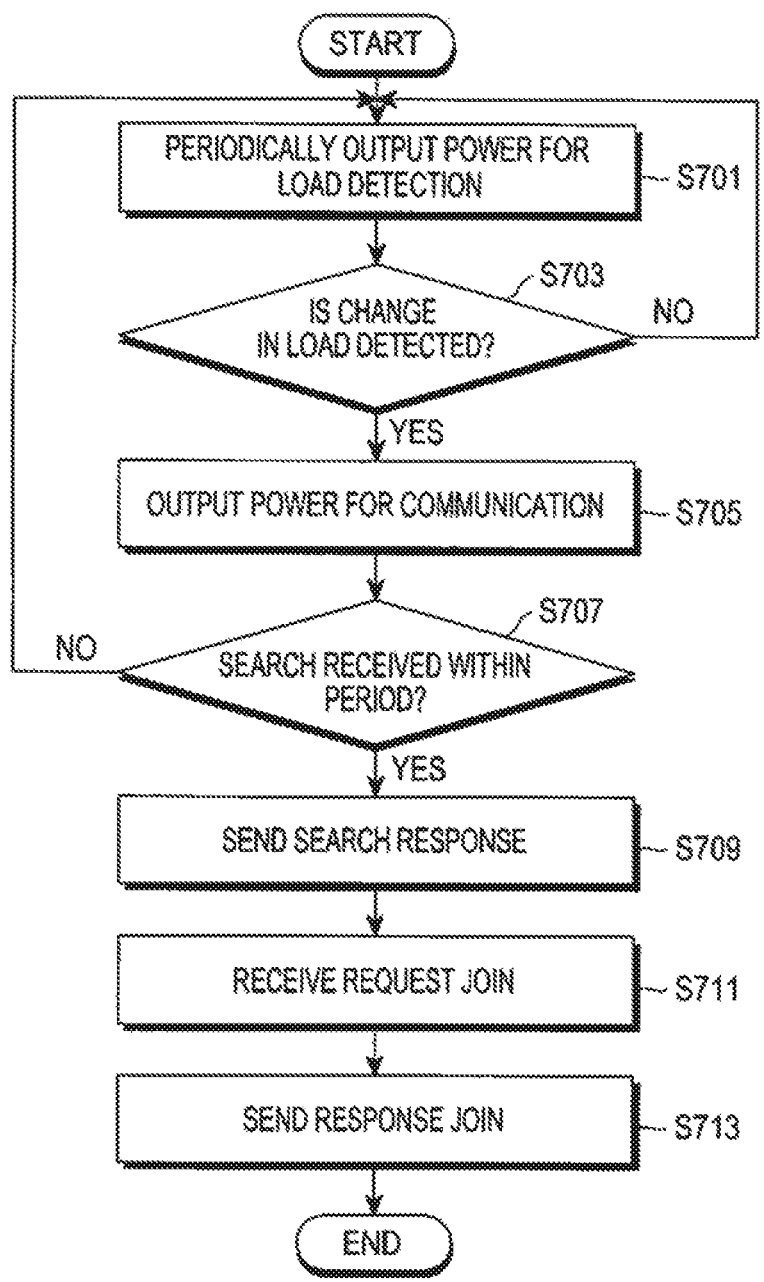
FIG. 7 is a flowchart illustrating a method in a wireless power transmitter according to an embodiment of the present invention.

FIG. 7 is a flowchart illustrating a method in a wireless power transmitter according to an embodiment of the present invention.

Referring to FIG. 7, the wireless power transmitter periodically outputs detection power for detecting a change in load in step S701. If a change in the load is not detected (No in step S703), the wireless power transmitter continues to periodically output the detection power in step S701. However, if a change in load is detected (Yes in step S703), the wireless power transmitter outputs driving power for communication with a wireless power receiver in step S705. For example, the driving power is an amount of power capable of driving a controller of the wireless power receiver.

In step S707, the wireless power transmitter determines whether a Search signal is received within a predetermined period. If no Search signal is received within the predetermined period (No in step S707), the wireless power transmitter outputs detection power in step S701. However, if a Search signal is received within the predetermined period (Yes in step S707), the wireless power transmitter generates and transmits a Search Response signal in step S709. In step S711, the wireless power transmitter receives a Request Join signal in step S711, and in step S713, generates and transmits a Response Join signal, in response to the Request Join signal.

Figure 8A:
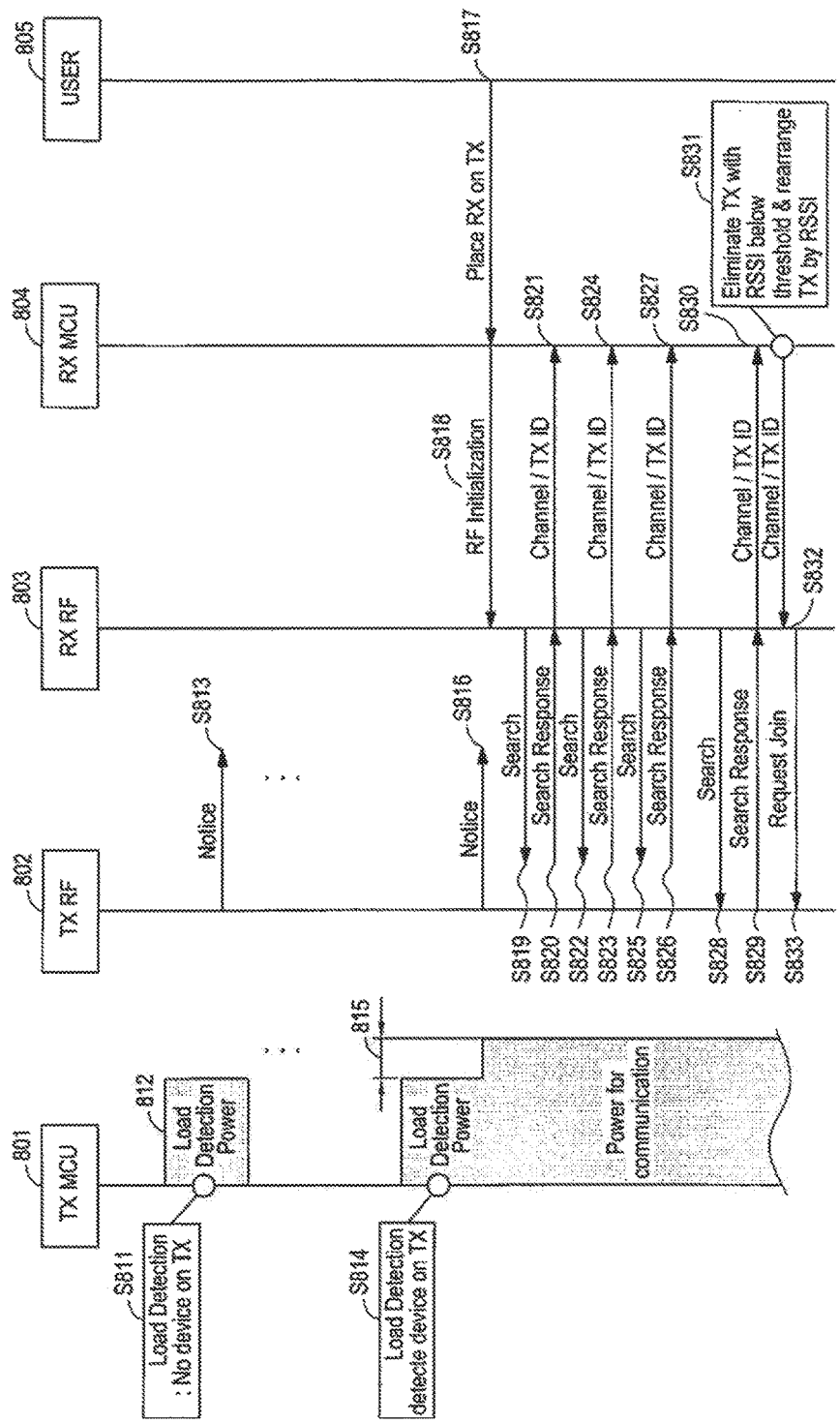
FIGS. 8A and 8B are timing diagrams illustrating an operation wherein a wireless power receiver fails to join a wireless power network managed by a wireless power transmitter, according to an embodiment of the present invention.
Figure 8B:
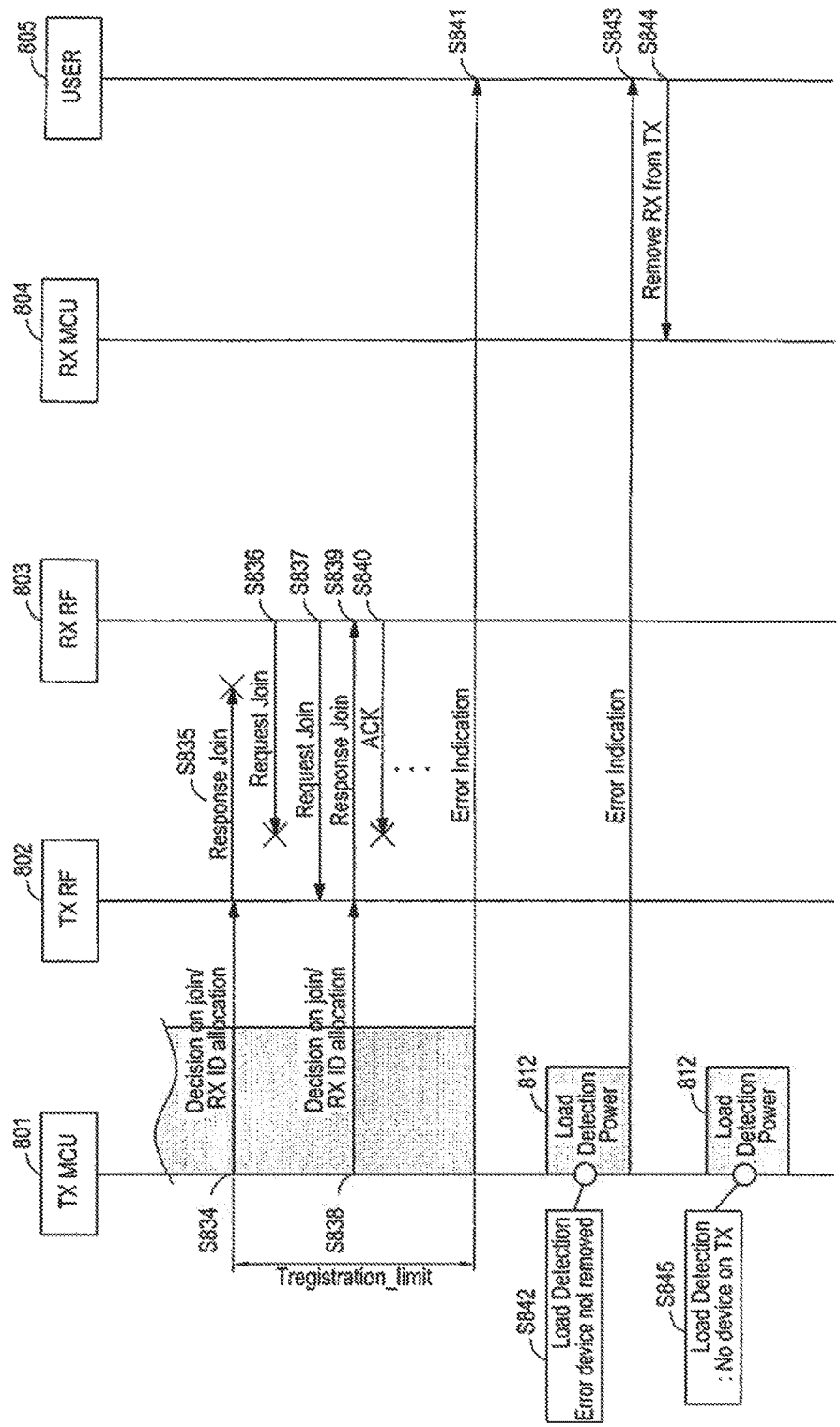

FIGS. 8A and 8B are timing diagrams illustrating an operation wherein a wireless power receiver fails to join a wireless power network managed by a wireless power transmitter, according to an embodiment of the present invention.

Referring to FIG. 8A, a controller 801 of the wireless power transmitter periodically outputs detection power 812 and performs load detection in steps S811 and S815, and periodically transmits a Notice signal in steps S813 and S816.

A user 805 places a wireless power receiver on or over the wireless power transmitter in step S817, and a controller 801 detects a change in load in step S814. The controller 801 increases applied power to driving power by a value 815, and a communication unit 803 of the wireless power receiver is initialized by a controller 804 of the wireless power receiver in step S818. The communication unit 803 transmits a wireless power transmitter search signal and a wireless power transmitter search response signal in another channel, and stores related information in steps S819 to S827.

Additionally, the communication unit 803 transmits a wireless power transmitter search signal, receives a wireless power transmitter search response signal by changing channels, and stores related information in steps S828 to S830.

The controller 804 determines a wireless power transmitter from which it will receive wireless power in step S831, and generates a Request Join signal in step S832. The communication unit 803 transmits the generated Request Join signal to the communication unit 802 in step S833.

The controller 801 permits joining of the wireless power receiver, and allocates a session ID thereto in step S834. The communication unit 802 transmits a Response Join signal to the communication unit 803 in step S835. However, in FIGS. 8A and 8B, the Response Join signal fails to be received at the communication unit 803 of the wireless power receiver.

The communication unit 803 retransmits the Request Join signal in step S836, because it has failed to receive the Response Join signal in step S835. However, the retransmitted Request Join signal also fails to be received at the communication unit 802. The communication unit 803 retransmits the Request Join signal in step S837, because it has failed to receive the Response Join signal.

In step S838, the controller 801 permits the joining of the wireless power receiver, and allocates a session ID thereto. The communication unit 802 transmits a Response Join signal to the communication unit 803 in step S839.

In step S840, the communication unit 803 transmits an Ack signal for the Response Join signal to the communication unit 802 in step S840. However, the Ack signal fails to be received at the communication unit 802.

The controller 801 notifies of an occurrence of an error in step S841, when it determines that the signal transmission/reception has failed three times for a registration limit time (or a join limit time) Tregistration_limit. The 'three times' is a mere example, and is subject to change.

In accordance with another embodiment of the present invention, the controller 801 of the wireless power transmitter may immediately notify the error, upon a lapse of the registration limit time, regardless of the number of the signal transmission/reception failures, in step S841.

For the notification of the error, visual or acoustic indicator devices may be used to generate an alert tone or to blink a Light Emitting Diode (LED). Additionally, the occurrence of the error may be output on a display (not shown).

The controller 801 determines whether to remove the cause of an error, by load detection in step S842. The notification of the occurrence of an error may be repeated in step S843, until the wireless power receiver is removed from the wireless power transmitter.

The controller 801 may determine whether to remove the wireless power receiver, based on whether the load has returned to the initial load.

Accordingly, the controller 801 periodically applies the detection power 812, and determines in steps S842 and S845 whether the load has returned to the initial load. When the load returns to the initial load, as the user 805 removes the wireless power receiver from the wireless power transmitter in step S844, the controller 801 of the wireless power transmitter stops the notification of the occurrence of an error.

Figure 9A:
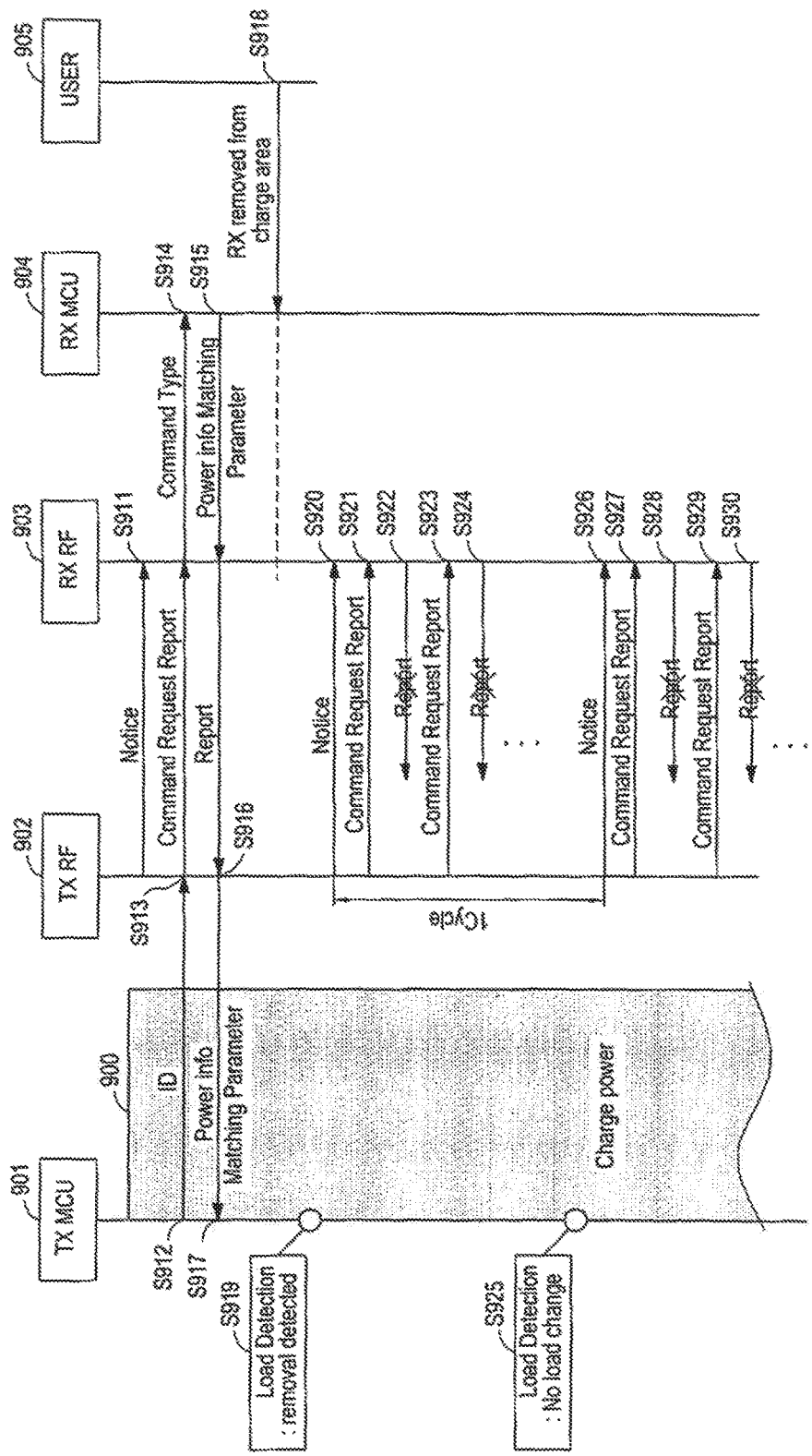
FIGS. 9A and 9B are timing diagrams illustrating an operation for determining to remove a wireless power receiver from a wireless power network managed by a wireless power transmitter according to an embodiment of the present invention.
Figure 9B:
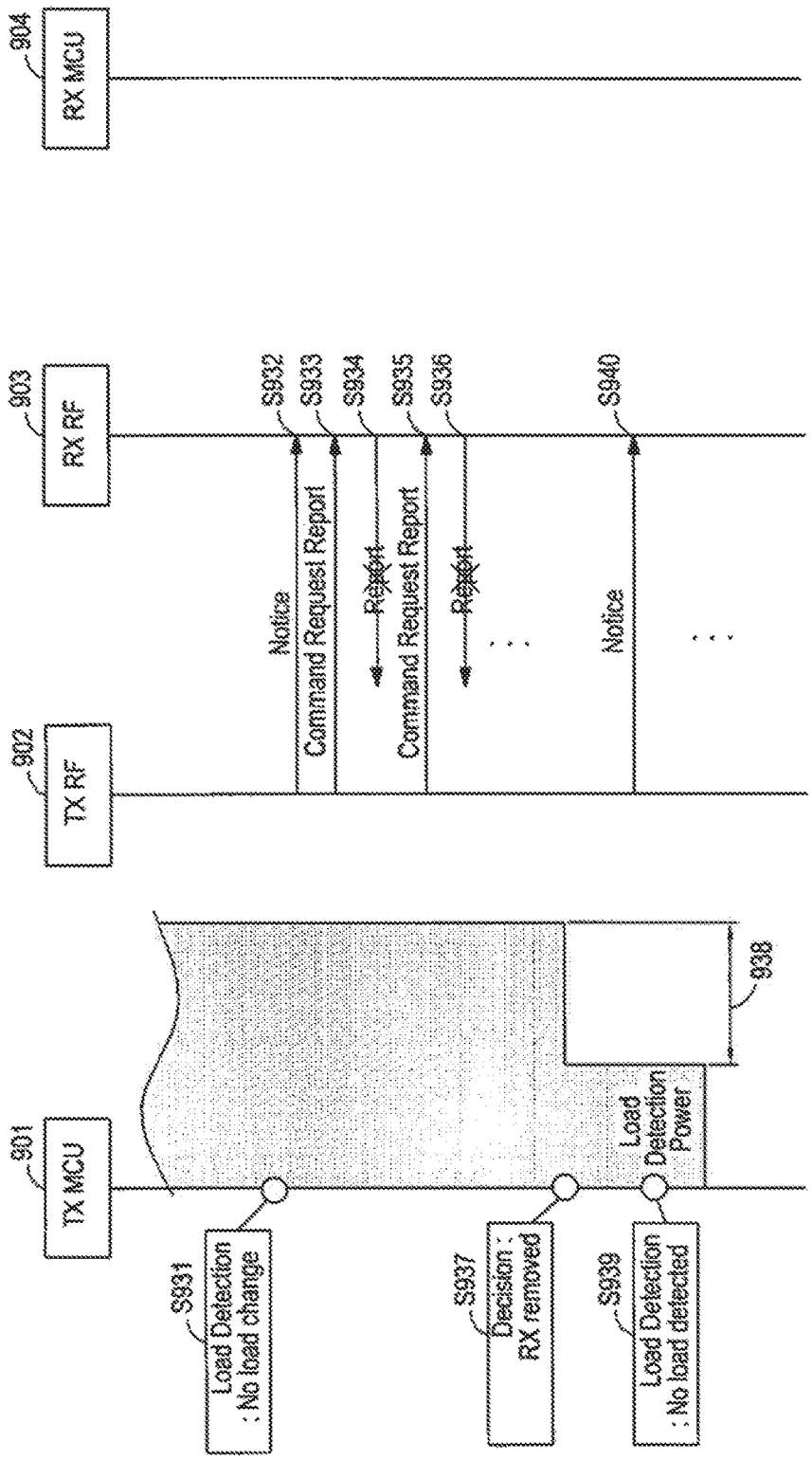

FIGS. 9A and 9B are timing diagrams illustrating a method for determining to remove a wireless power receiver from a wireless power network managed by a wireless power transmitter according to an embodiment of the present invention.

Referring to FIG. 9A, a wireless power transmitter outputs charging power 900 to a wireless power receiver. In step S911, a communication unit 902 of the wireless power transmitter transmits a Notice signal. The wireless power receiver determines whether to perform communication, by identifying an 'Rx to Report (schedule mask)' field in the Notice signal.

A controller 901 of the wireless power transmitter generates a Command signal including its session ID information in step S912, and controls the communication unit 902 to transmit the Command signal to a communication unit 903 of the wireless power receiver in step S913. A controller 904 of the wireless power receiver analyzes the Command signal in step S914, and generates a Report signal including information about the current power situation in step S915. The communication unit 903 transmits the generated Report signal to the communication unit 902 in step S916. The controller 901 performs impedance matching and the like, based on the received Report signal in step S917.

A user 905 removes the wireless power receiver in step S918. In step S919, the controller 901 detects a change in load. The communication unit 902 transmits a Notice signal in step S920, and transmits a Command signal in step S921. The communication unit 902 does not receive a Report signal in step S922 due to the removal of the wireless power receiver. The communication unit 902 of the wireless power transmitter continues to transmit the Command signal during one superframe cycle, which is a period where a Notice signal is transmitted, in steps S921 and S923. However, the communication unit 902 fails to receive the Report signal in steps S922 and S924.

The controller 901 performs load detection again in step S925, transmits a Notice signal even during the next one superframe cycle in step S926, and transmits a Command signal in steps S927 and S929. Even during that cycle, the communication unit 902 fails to receive the Report signal in steps S928 and S930. The controller 901 performs load detection again in step S931, transmits a Notice signal even during the next one superframe cycle in step S932, and transmits a Command signal in steps S933 and S935. Even during that cycle, the communication unit 902 of the wireless power transmitter fails to receive the Report signal in steps S934 and S936.

If the communication unit 902 fails to receive a Report signal or an Ack signal even during three superframe cycles, the controller 901 determines, in step S937, that the wireless power receiver is removed. As a result, the controller 901 reduces the applied power to detection power by a value 938.

Thereafter, the controller 901 performs load detection again by periodically applying detection power in step S939, and the communication unit 902 transmits a Notice signal in step S940. As described above, the wireless power transmitter may reliably determine whether the wireless power receiver is removed, contributing to prevention of power waste.

Figure 10:
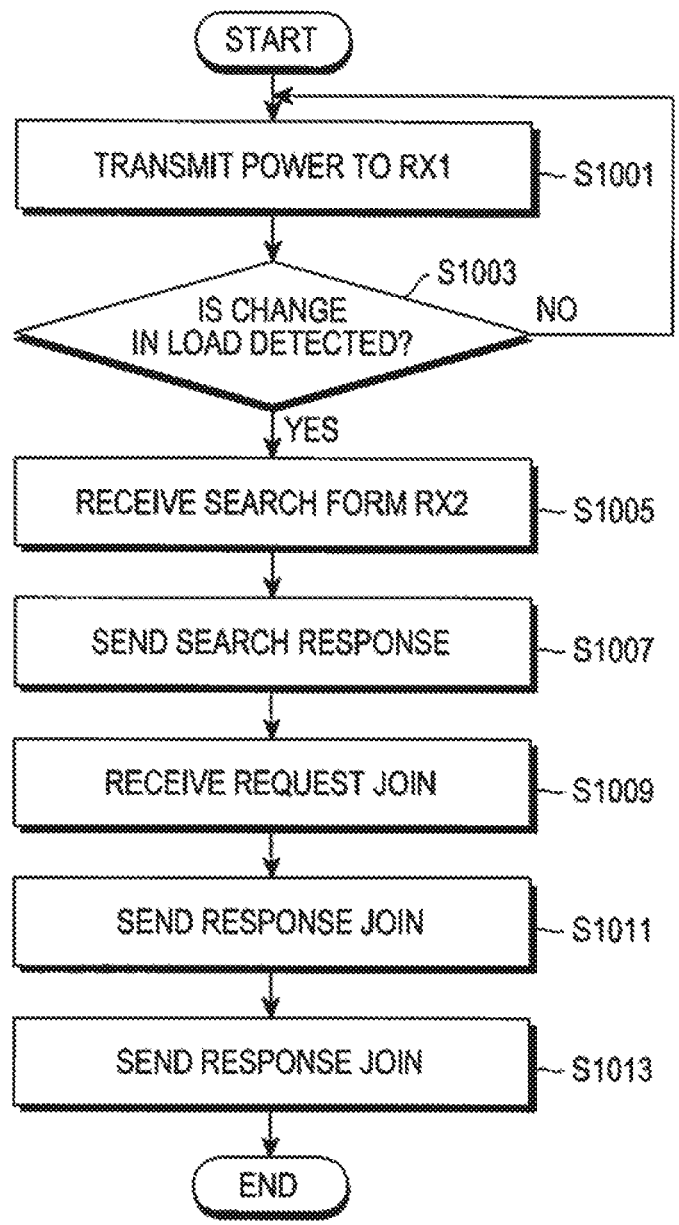
FIG. 10 is a flowchart illustrating a method for joining of a wireless power receiver and transmission of charging power in a wireless power transmitter according to an embodiment of the present invention.

FIG. 10 is a flowchart illustrating a method joining a wireless power receiver and transmitting charging power in a wireless power transmitter according to an embodiment of the present invention. In FIG. 10, it is assumed that a wireless power transmitter and one wireless power receiver are already performing charging.

Referring to FIG. 10, the wireless power transmitter transmits first charging power to a first wireless power receiver in step S1001. A user then places a second wireless power receiver on or near the wireless power transmitter.

The wireless power transmitter detects a change in load based on the placement of the second power receiver in step S1003. Upon failure to detect the change in load (No in step S1003), the wireless power transmitter continues to transmit the first charging power to the first wireless power receiver in step S1001.

However, when the wireless power transmitter detects the change in load (Yes in step S1003), the second wireless power receiver transmits a Search signal and the wireless power transmitter receives the Search signal in step S1005. The wireless power transmitter generates and transmits a Search Response signal in response to the Search signal in step S1007. In addition, the wireless power transmitter receives a Request Join signal from the second wireless power receiver in step S1009, and transmits a Response Join signal corresponding thereto in step S1011. Accordingly, the second wireless power receiver may join in the wireless power network managed by the wireless power transmitter, and the wireless power transmitter further transmits second charging power in step S1013.

Figure 11A:
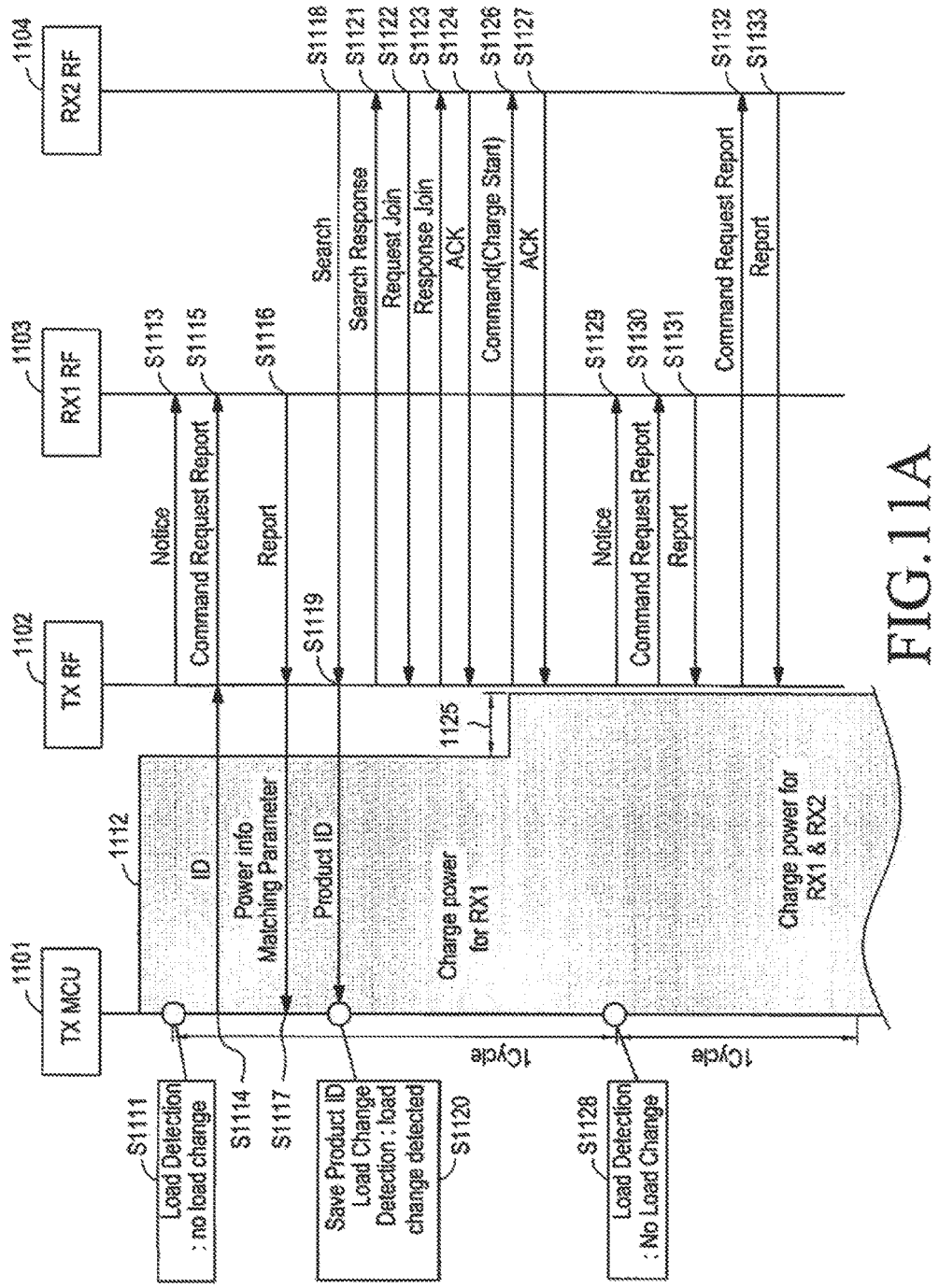
FIGS. 11A and 11B are timing diagrams illustrating a power supply operation between a wireless power transmitter and two wireless power receivers according to an embodiment of the present invention.
Figure 11B:
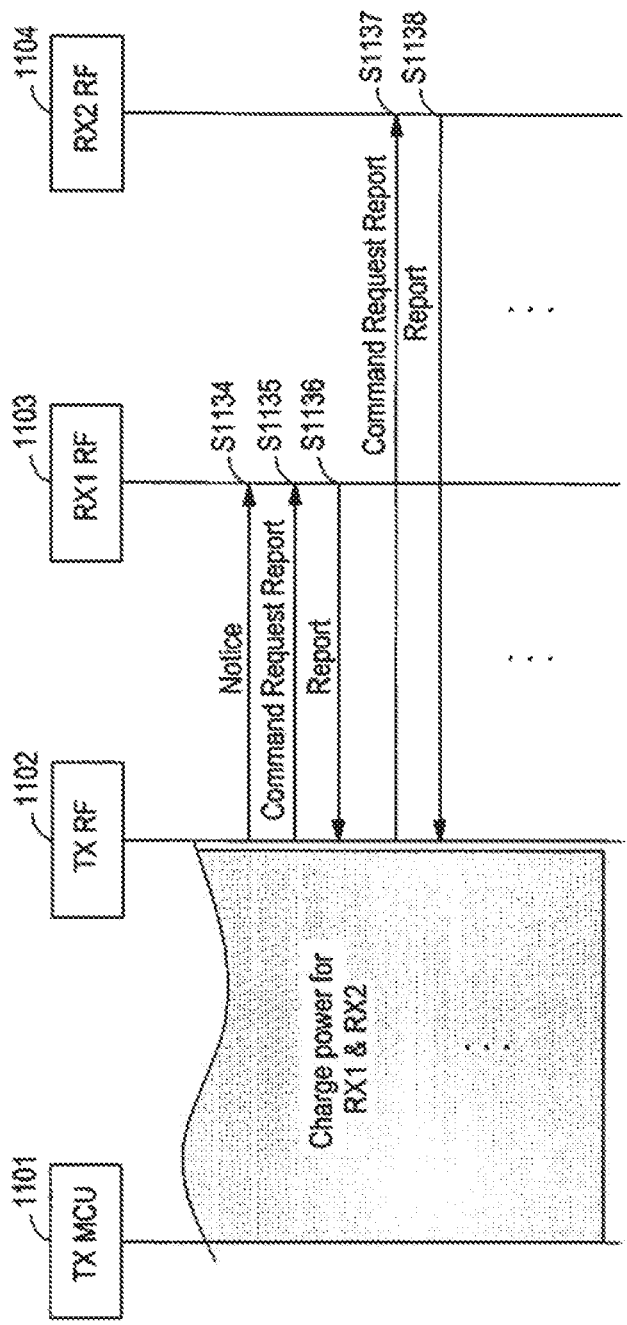

FIGS. 11A and 11B are timing diagrams illustrating a power supply operation between a wireless power transmitter and two wireless power receivers according to an embodiment of the present invention. Specifically, in FIGS. 11A and 11B, a first wireless power receiver 1103 is already performing charging by receiving first charging power from the wireless power transmitter.

Referring to FIG. 11A, a controller 1101 of the wireless power transmitter transmits first charging power 1112 for charging the first wireless power receiver 1103. In step S1111, the controller 1101 periodically detects a change in load, using the first charging power 1112. Further, a communication unit 1102 of the wireless power transmitter transmits a Notice signal in step S1113. A 'Number of Rx' field of the Notice signal includes information indicating that the number of wireless power receivers presently being charged is one.

The controller 1101 generates a Command signal including a session ID of the first wireless power receiver 1103 in step S1114, and the communication unit 1102 transmits the generated Command signal in step S1115. A 'Request report' is written in a command Type field of the Command signal. The first wireless power receiver 1103 measures its current power situation based on the Command signal, generates a Report signal including its current power situation, and transmits the Report signal to the communication unit 1102 in step S1116.

The controller 1101 manages the power situation based on the received Report signal, and performs impedance matching in step S1117.

A user places a second wireless power receiver 1104 on or near the wireless power transmitter, and the controller 1101 detects an abrupt change in load in step S1120. The second wireless power receiver 1104 generates a Search signal including a product ID and transmits the Search signal to the communication unit 1102 in step S1118. The controller 1101 identifies the product ID of the second wireless power receiver 1104 based on the received Search signal, and manages the product ID by registering it in a device control table as illustrated in FIG. 18, in step S1119. In step S1121, the communication unit 1102 transmits a Search Response signal corresponding to the Search single.

The second wireless power receiver 1004 transmits a Request Join signal to the communication unit 1102 in step S1122. In response, the communication unit 1102 transmits a Response Join signal in step S1123. The controller 1101 determines whether to permit joining of the second wireless power receiver 1104 and transmits a Response Join signal including the permission of joining. In response, the second wireless power receiver 1104 transmits an Ack signal in step S1124 and enters a standby state after joining in the network.

The controller 1101 transmits second charging power 1125 for charging the second wireless power receiver 1104. In addition, the communication unit 1102 transmits a Command signal including a charge start command to the second wireless power receiver 1104 in step S1126. The second wireless power receiver 1104 performs charging by turning on a switching unit connected to a charging unit thereof, based on the Command signal. In addition, the second wireless power receiver 1104 transmits an Ack signal in step S1127.

The controller 1101 checks for a change in load, after a lapse of the predetermined period, in step S1128. If there is no change in load, the controller 1101 of the wireless power transmitter transmits the same charging powers, i.e., the first and second charging powers.

In step S1129, the communication unit 1102 transmits a Notice signal. In addition, the communication unit 1102 transmits a Command signal to each of the first and second wireless power receivers 1103 and 1104 in steps S1130 and S1132. The communication unit 1102 receives a Report signal from each of the first and second wireless power receivers 1103 and 1104 in steps S1131 and S1133.

After a lapse of the predetermined period, the communication unit 1102 transmits a Notice signal in step S1134. In addition, the communication unit 1102 transmits a Command signal to the first and second wireless power receivers 1103 and 1104 in steps S1135 and S1137, respectively. The communication unit 1102 receives a Report signal from the first and second wireless power receivers 1103 and 1104 in steps S1136 and S1138, respectively.

Figures 12A, 12B:
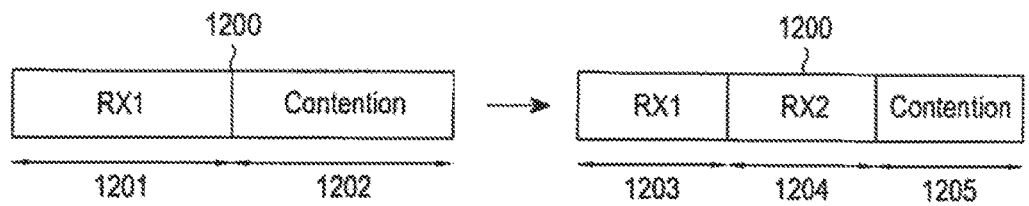
FIGS. 12A and 12B are timing split diagrams for a wireless power transmitter according to an embodiment of the present invention.

FIGS. 12A and 12B illustrate timing split diagrams for a wireless power transmitter according to an embodiment of the present invention.

Referring to FIG. 12A, where the wireless power transmitter manages only the first wireless power receiver 1103, a half of the full superframe cycle is allocated as a time 1201 for communication with the first wireless power receiver 1103, while the other half is allocated as a contention period 1202. The contention period may be a period allocated for a case where communication is not performed.

Referring to FIG. 12B, when the second wireless power receiver 1104 has joined in the wireless power network, the wireless power transmitter splits the allocated full period 1200 into three equal parts, and allocates them to a period 1203 for communication with the first wireless power receiver 1103, a period 1204 for communication with the second wireless power receiver 1104, and a contention period 1205, respectively.

Figure 13:
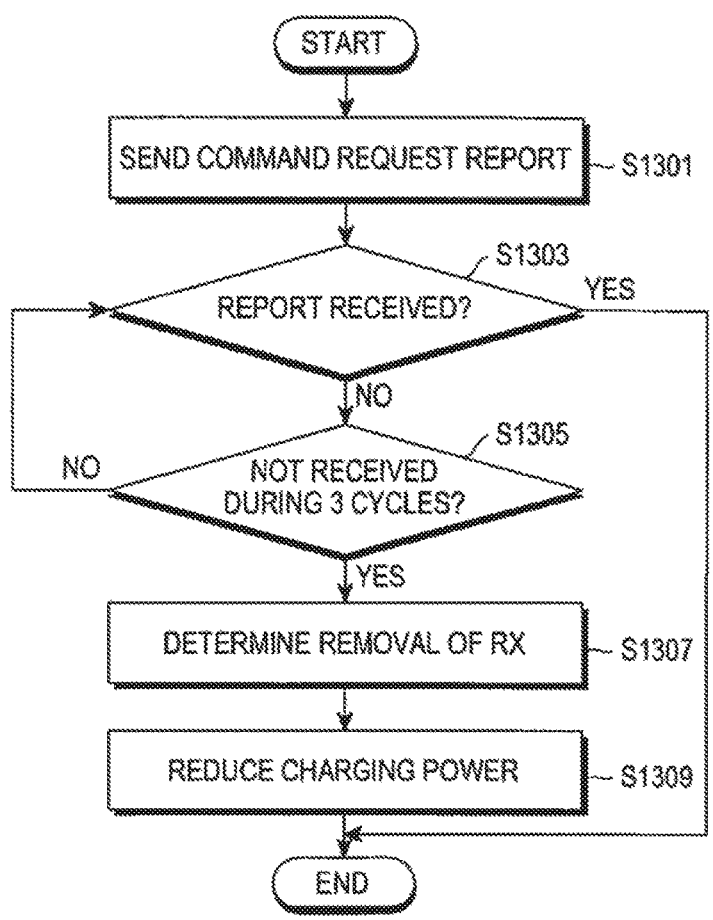
FIG. 13 is a flowchart illustrating a method of a wireless power transmitter according to an embodiment of the present invention.

FIG. 13 is a flowchart illustrating a method in a wireless power transmitter according to an embodiment of the present invention.

Referring to FIG. 13, the wireless power transmitter transmits a Command signal for requesting a Report signal in step S1301. Upon failure to receive a Report signal (No in step S1303), the wireless power transmitter waits for reception of a Report signal in the next superframe cycle. Upon failure to receive Report signal during the next three superframe cycles (Yes in step S1305), the wireless power transmitter determines in step S1307 that the wireless power receiver is removed. In step S1309, the wireless power transmitter reduces the charging power required to charge the wireless power receiver before power transmission.

However, if a Report signal is received (Yes in step S1303), the wireless power transmitter transmits a Command signal after the next superframe cycle.

Figures 14A, 14B:
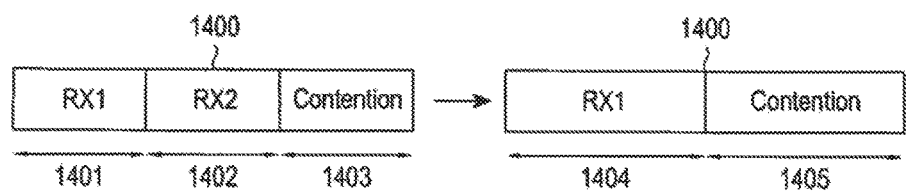
FIGS. 14A and 14B illustrate changes in allotted times due to a removal of a wireless power receiver from a wireless power network managed by a wireless power transmitter according to an embodiment of the present invention.

FIGS. 14A and 14B illustrate changes in allotted times due to a removal of a wireless power receiver according to an embodiment of the present invention.

Referring to FIGS. 14A and 14B, when a wireless power transmitter manages two wireless power receivers, the wireless power transmitter splits the full superframe cycle into three equal parts, and allocate them to a period 1401 for communication with a first wireless power receiver, a period 1402 for communication with a second wireless power receiver, and a contention period 1403, respectively, as illustrated in FIG. 14A. However, if, for example, the second wireless power receiver is removed, the wireless power transmitter splits the full superframe cycle into two equal parts, and allocates them to a period 1404 for communication with the first wireless power receiver and a contention period 1405, respectively, as illustrated in FIG. 14B.

Figures 15A, 15B:
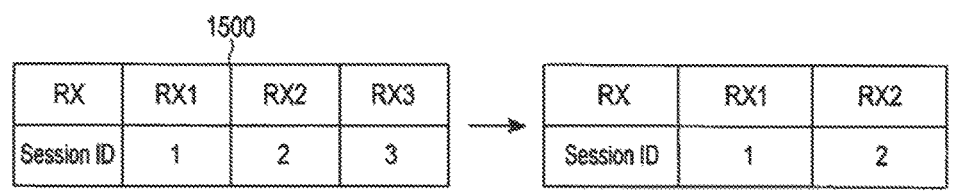
FIGS. 15A to 15C illustrate device control tables for managing wireless power receivers in a wireless power transmitter according to an embodiment of the present invention.
Figure 15C:
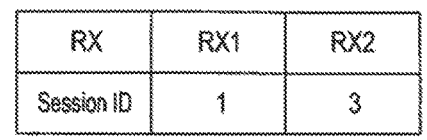

FIGS. 15A to 15C illustrate device control tables that are used for managing wireless power receivers in a wireless power transmitter according to an embodiment of the present invention.

In FIG. 15A, a wireless power transmitter manages first to third wireless power receivers. Accordingly, the wireless power transmitter allocates session IDs of 1, 2, and 3 to the first to third wireless power receivers, respectively. Thereafter, if it is determined that the second wireless power receiver is removed, the wireless power transmitter deletes the session ID allocated for the second wireless power receiver from the device control table. The wireless power transmitter allocates the session ID for the second wireless power receiver to the third wireless power receiver, as illustrated in FIG. 15B. Otherwise, the wireless power transmitter manages the third wireless power receiver to keep its session ID, as illustrated in FIG. 15C.

Figure 16A:
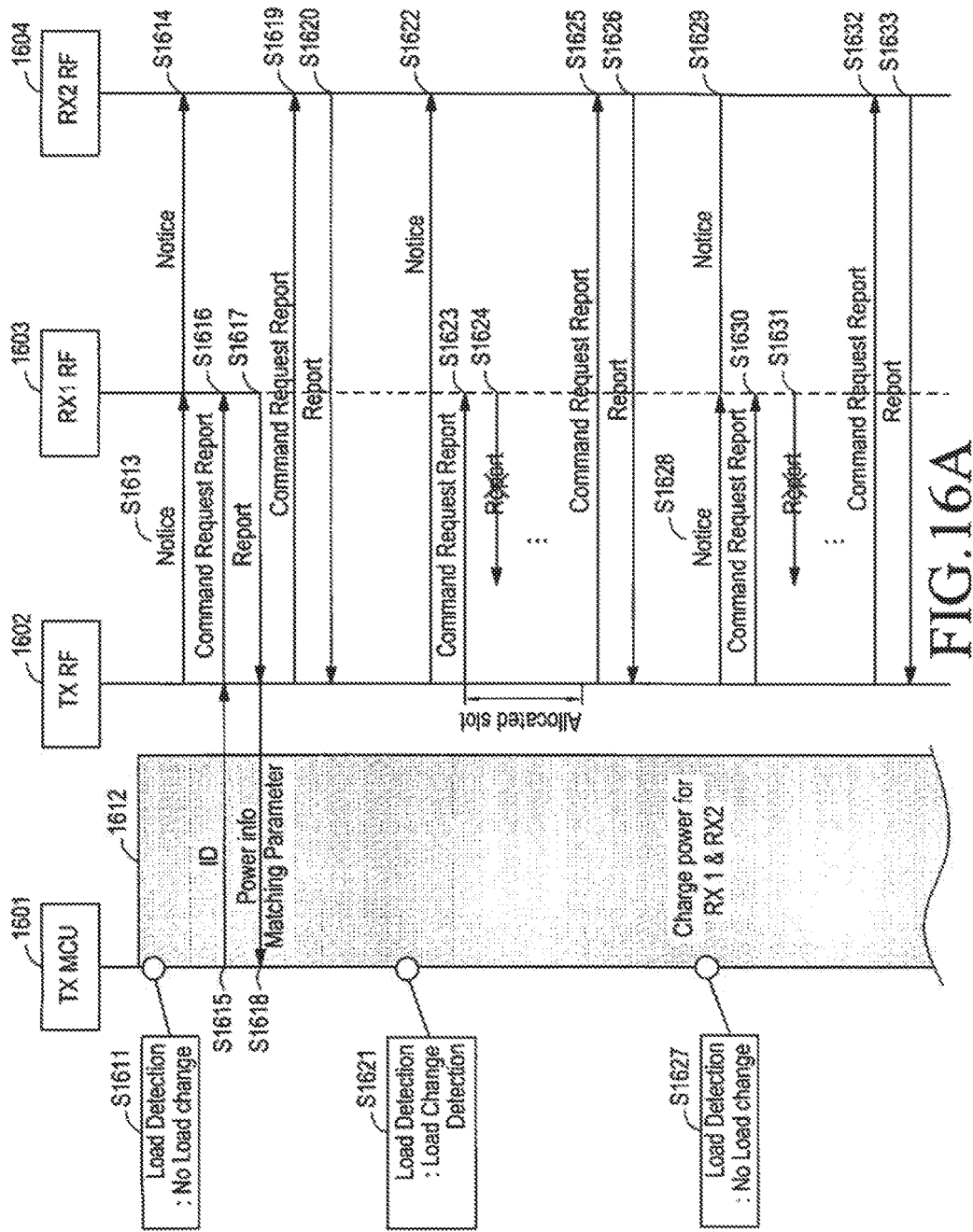
FIGS. 16A and 16B are timing diagrams illustrating an operation for removing one of two wireless power receivers from a wireless power network managed by a wireless power transmitter, according to an embodiment of the present invention.
Figure 16B:
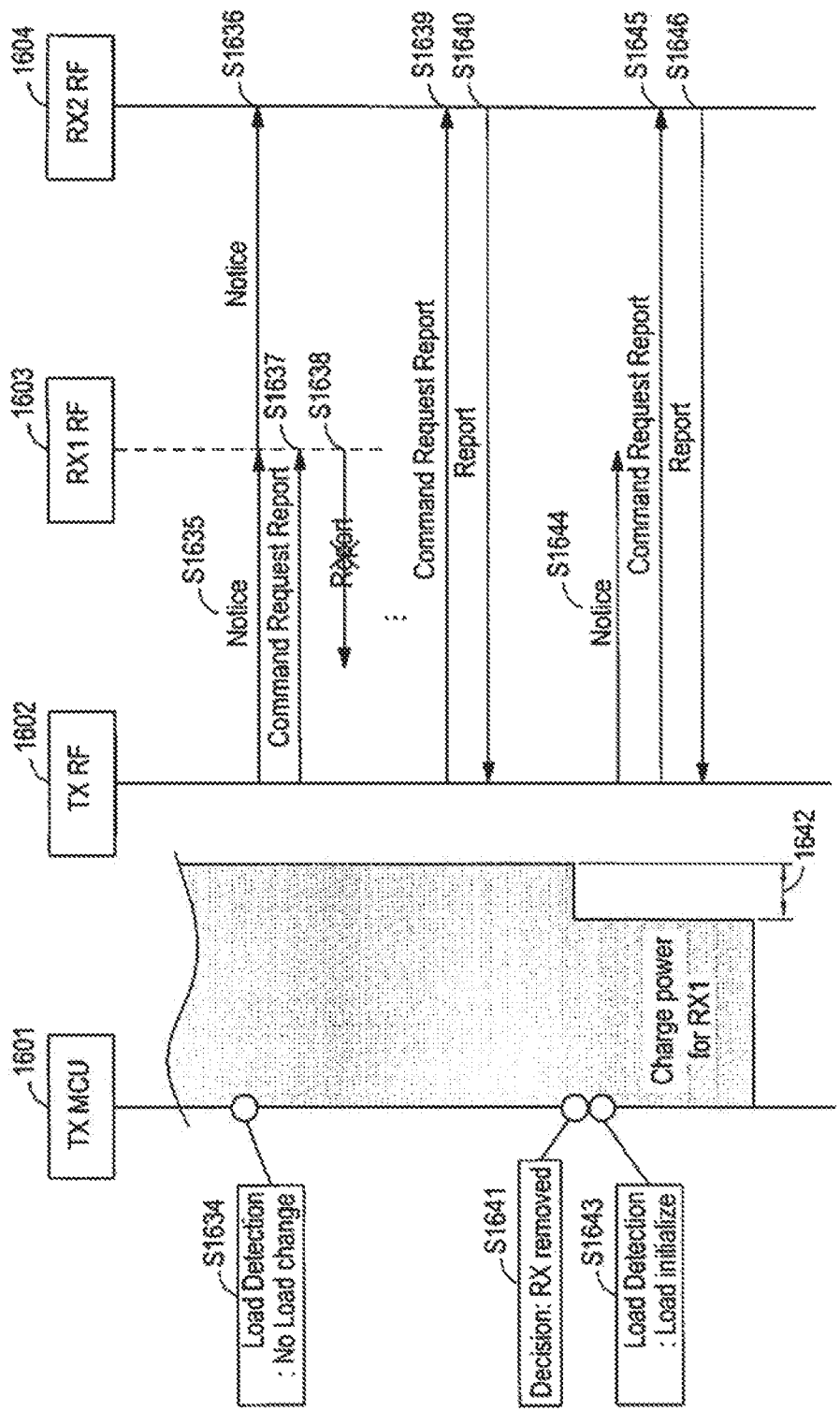

FIGS. 16A and 16B are timing diagrams illustrating an operation wherein one of two wireless power receivers is removed from a wireless power network managed by a wireless power transmitter, according to an embodiment of the present invention.

Referring to FIG. 16A, a controller 1601 of the wireless power transmitter transmits charging power 1612 for charging first and second wireless power receivers 1603 and 1604. Because no change in load is detected in step S1611, the controller 1601 continues to transmit the charging power 1612. In addition, a communication unit 1602 of the wireless power transmitter transmits a Notice signal to the first and second wireless power receivers 1603 and 1604 in steps S1613 and S1614. The communication unit 1602 generates a Command signal in step S1615, and transmits the generated Command signal to the first wireless power receiver 1603 in step S1616. The first wireless power receiver 1603 generates a Report signal and transmits it to the communication unit 1602 in step S1617. The controller 1601 determines the current power situation by analyzing the Report signal, and performs impedance matching in step S1618.

The communication unit 1602 transmits a Command signal to the second wireless power receiver 1604 in step S1619, and receives a Report signal from the second wireless power receiver 1604 in step S1620.

A user removes the first wireless power receiver 1603, and the controller 1601 detects an abrupt change in load in step S1621. As described above with reference to FIGS. 4A to 4E, the controller 1601 may determine whether the first wireless power receiver 1603 is removed, based on various criteria, e.g., the load, in various positions of the wireless power transmitter.

In step S1622, the communication unit 1602 transmits a Notice signal to the second wireless power receiver 1604. In step 1623, the communication unit 1602 transmits a Command Request Report signal to the first wireless power receiver 1603. In step S1624, the first wireless power receiver 1603 may not return a Report signal. In step 1625, the communication unit 1602 transmits a Command Request Report signal to the second wireless power receiver 1604. In step S1626, the second wireless power receiver 1604 may return a Report signal.

In step S1627, the controller 1601 detects no change in load. The communication unit 1602 transmits a Notice signal in steps S1628 and S1629. The communication unit 1602 transmits a Command signal to the first wireless power receiver 1603 in step S1630, but fails to receive a Report signal in step S1631 because of the removal of the first wireless power receiver 1603. Subsequently, the communication unit 1602 transmits a Command signal to the second wireless power receiver 1604 in step S1632, and the second wireless power receiver 1604 transmits a Report signal in step S1633.

The controller 1601 detects no change in load in step S1634. In steps S1635 and S1636, the communication unit 1602 transmits a Notice signal. The communication unit 1602 transmits a Command signal to the first wireless power receiver 1603 in step S1637, but fails to receive a Report signal in step S1638 because of the removal of the first wireless power receiver 1603. Subsequently, the communication unit 1602 transmits a Command signal to the second wireless power receiver 1604 in step S1639, and the second wireless power receiver 1604 transmits a Report signal in step S1640.

Upon failure to receive a Report signal from the first wireless power receiver 1603, e.g., during three superframe cycles, the controller 1601 of the wireless power transmitter determines in step S1641 that the first wireless power receiver 1603 has been removed. Thereafter, the controller 1601 reduces first charging power 1642.

The controller 1601 performs load detection in step S1643, and transmits a Notice signal in step S1644. The communication unit 1602 transmits a Command signal only to the second wireless power receiver 1604 in step S1645, and receives a Report signal in response thereto in step S1646.

Figure 17A:
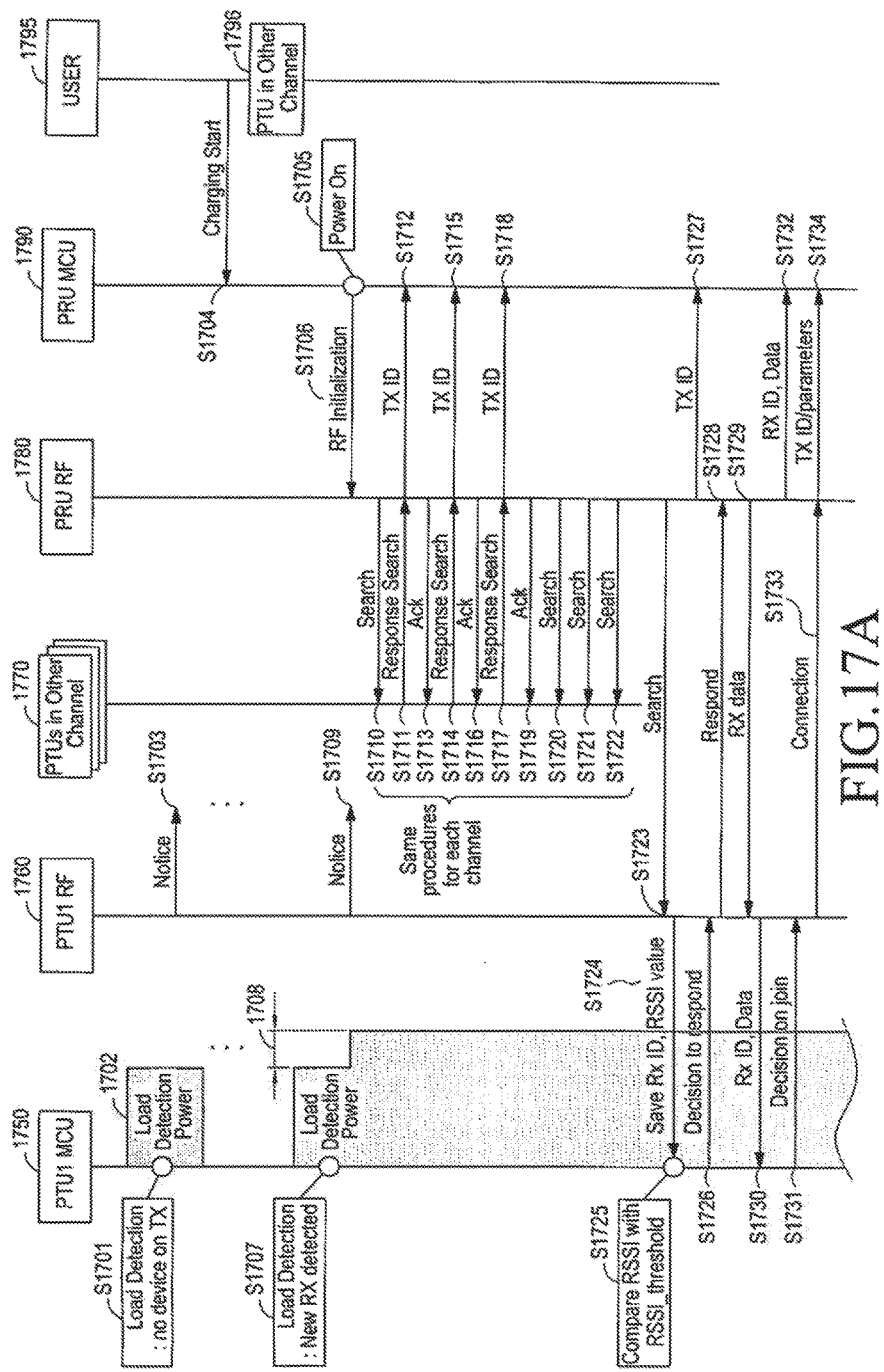
FIGS. 17A and 17B are timing diagrams illustrating communication signaling between a wireless power transmitter and a wireless power receiver according to an embodiment of the present invention.
Figure 17B:
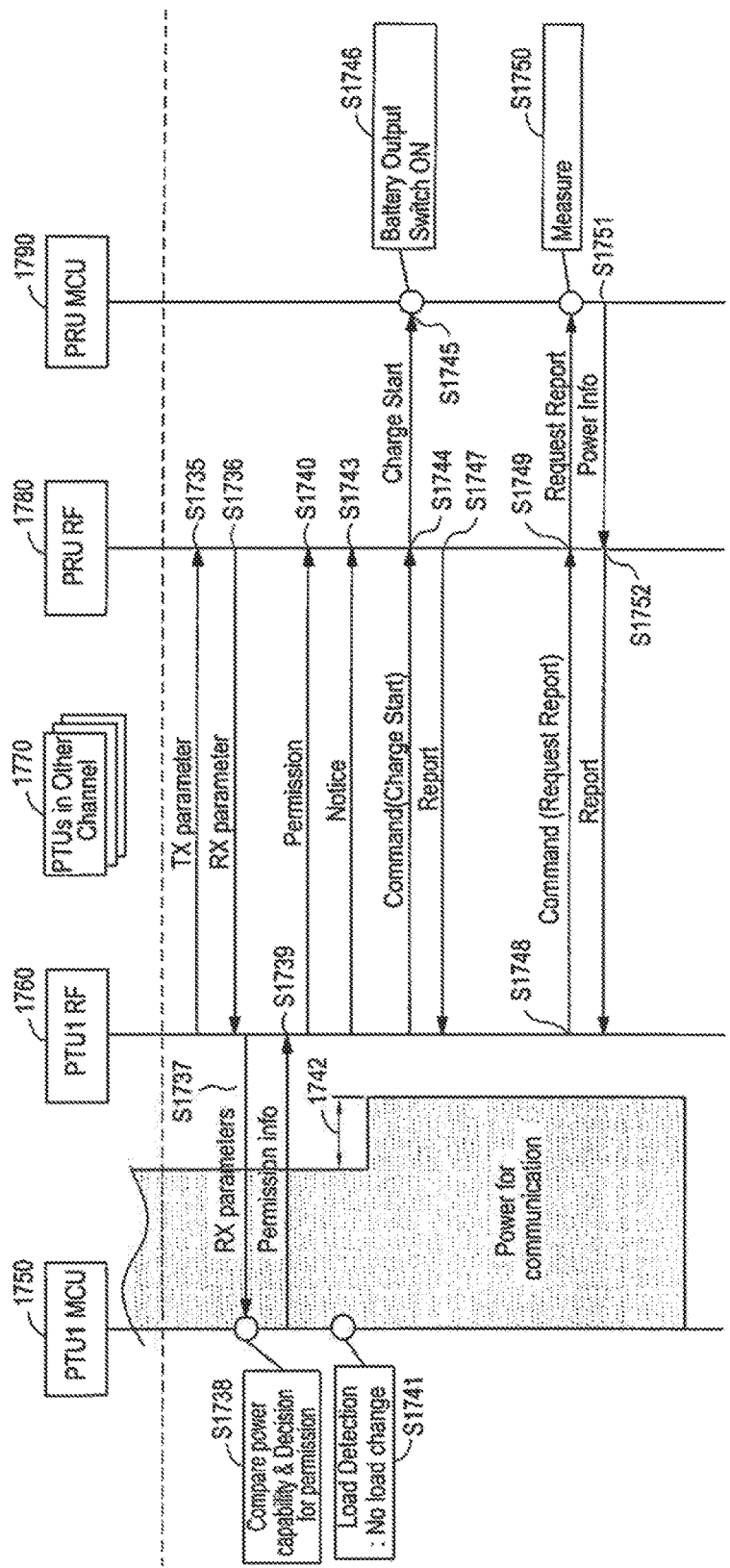

FIGS. 17A and 17B are timing diagrams illustrating communication between a wireless power transmitter and a wireless power receiver according to an embodiment of the present invention. Specifically, FIGS. 17A and 17B are timing diagrams for a wireless power transmitter and a wireless power receiver performing communication based on a BLE scheme.

Referring to FIG. 17A, a controller 1750 of the wireless power transmitter checks for a change in load by applying detection power 1702 at stated periods in step S1701. In addition, a communication unit 1760 of the wireless power transmitter transmits a Notice signal at stated periods in step S1703. In FIG. 17A, the controller 1750 fails to detect an abrupt change in load in step S1701.

In step S1704, a user 1795 places the wireless power receiver on or near the wireless power transmitter.

In step S1707, the controller 1750 re-applies detection power after the superframe cycle, and detects an abrupt change in load. When a device is detected within a valid detection period, the controller 1750 applies driving power (or registration power) Preg, which is greater than the detection power 1702 by a value 1708. The driving power may be power capable of driving a controller 1790 of the wireless power receiver.

A controller 1790 of the wireless power receiver is driven (or powered on) in step S1705, and initializes a communication unit 1780 of the wireless power receiver in step S1706. The controller 1750 determines the presence of the wireless power receiver depending on the presence of a pulse that is initiated by the controller 1790. The controller 1750 may update the wireless power receiver, the presence of which is determined by the controller 1750, in a device control table.

For example, the device control table manages each wireless power receiver's session ID, company ID, product ID, load characteristic, current characteristic, voltage characteristic, efficiency characteristic, current status, a voltage at a front end of a DC/DC converter of the wireless power receiver, a voltage at a rear end of the DC/DC converter of the wireless power receiver, and a current at the rear end of the DC/DC converter of the wireless power receiver. The current status is information indicating whether the wireless power receiver is in the standby state after being fully charged, whether the wireless power receiver is in the standby state due to the lack of charging power, whether the wireless power receiver is being charged in a CV mode, or whether the wireless power receiver is being charged in a CC mode.

The communication unit 1780 uses a second channel under control of the controller 1790. The second channel is a channel used by another wireless power transmitter 1770, which is different from the channel used by the communication unit 1760. Accordingly, the channel used by the communication unit 1760 is called a first channel.

The order, in which the controller 1790 determines a search channel, may be set in advance, and the initial search channel searched by the controller 1790 may be randomly selected from the BLE channels.

The communication unit 1780 transmits a wireless power transmitter search signal in the second channel in step S1710. The wireless power transmitter search signal may include device information of the wireless power receiver. For example, the device information of a wireless power receiver may include an ID of the wireless power receiver and information about a device of the wireless power receiver. The information about a device of a wireless power receiver may include at least one of a company, a serial number, a protocol version, a hardware version, and a parameter associated with charging of the wireless power receiver.

In FIG. 17A, three wireless power transmitters use the second channel, and each of the three wireless power transmitters 1770 may transmit a wireless power transmitter search response signal to the communication unit 1780 in response to the wireless power transmitter search signal in steps S1711, S1714, and S1717. The communication unit 1780 transmits a response signal or an Ack signal to the three wireless power transmitters 1770 in steps S1713, S1716, and S1719.

The communication unit 1780 transmits a Search signal in steps S1720, S1721, and S1722.

The controller 1790 may change the search channel to the first channel. The communication unit 1780 transmits a Search signal using the first channel in step S1723. The communication unit 1760 receives the Search signal, and the controller 1750 stores identifier information of the wireless power receiver and an RSSI value in step S1724. The controller 1750 compares the stored RSSI with an RSSI threshold in step S1725, and determines whether to respond to the Search signal in step S1726.

When the wireless power transmitter determines to respond, the communication unit 1760 transmits a Response signal in step S1728. The Response signal may include device information of the wireless power transmitter. The device information of a wireless power transmitter may include an ID of the wireless power transmitter.

The controller 1790 controls the communication unit 1780 of the wireless power receiver in step S1732, and the communication unit 1780 transmits an identifier and device information of the wireless power receiver in step S1729. The controller 1750 receives the identifier and device information in step S1730, and determines whether to join the wireless power receiver in step S1731.

When the wireless power transmitter determines to join the wireless power receiver, the communication unit 1760 transmits a Connection signal to the communication unit 1780 in step S1733. The Connection signal may include information such as a keep-alive period, and an address of each of a wireless power transmitter and a wireless power receiver. The wireless power receiver determines an ID of the wireless power transmitter and parameters, based on the received Connection signal in step S1734.

In accordance with an alternative embodiment of the present invention, the communication unit 1760 may form a communication network by transmitting a Connection signal in step S1733, immediately after receiving the Search signal from the wireless power receiver in step S1723.

The communication unit 1760 transmits a parameter signal 'TX parameter' of the wireless power transmitter to the communication unit 1780 of the wireless power receiver in step S1735. The parameter signal of a wireless power transmitter may include at least one of an identifier of the wireless power transmitter, the wireless power receiver's identifier, company, serial number, protocol version and hardware version, the amount of available charging power of the wireless power transmitter, the number of wireless power receivers presently being charged, the amount of presently charged power, and the amount of available surplus power.

The communication unit 1780 transmits a parameter signal 'RX parameter' of the wireless power receiver in step S1736. The controller 1750 receives parameters of the wireless power receiver in step S1737 and determines whether to join the wireless power receiver in the wireless power network by analyzing the parameters of the wireless power receiver in step S1738. The controller 1750 generates a 'Permission info' signal indicating whether to permit the joining, in step S1739, and transmits the join permission signal to the communication unit 1780 of the wireless power receiver in step S1740. The subsequent charging process in steps S1741 to S1752 is the same as that in FIGS. 6A and 6B, which has already been described above. Accordingly, a repetitive detailed description of steps S1741 to S1752 will be omitted here.

As described above, embodiments of the present invention may reliably perform wireless charging based on the Zigbee scheme and the BLE scheme.

As is apparent from the foregoing description, various embodiments of the present invention provide a procedure in which a wireless power transmitter determines to join or remove a wireless power receiver from a wireless power network, thereby preventing power waste.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A wireless power transmitter, comprising:
   a resonator;
   a communication unit; and
   a processor configured to:
      register a wireless power receiver to a wireless power network corresponding to the wireless power transmitter,
      control such that a charging power for charging the wireless power receiver is applied to the resonator,
      detect a change of magnitude of power applied to the resonator,
      detect that the communication unit fails to receive a communication signal from the wireless power receiver in a predetermined time, and
      in response to detecting the change of the magnitude of the power applied to the resonator and that the communication unit fails to receive the communication signal from the wireless power receiver in the predetermined time, remove the wireless power receiver from the wireless power network.

2. The wireless power transmitter of claim 1, wherein the processor is further configured to control such that a detecting power for detecting another load change caused by a placement of an object is applied to the resonator, when no wireless power receivers remain registered to the wireless power network, after removing the wireless power receiver from the wireless power network.

3. The wireless power transmitter of claim 1, wherein the processor is further configured to adjust an amount of the charging power applied to the resonator, in response to removing the wireless power receiver from the wireless power network.

4. A control method of a wireless power transmitter, the control method comprising:
   registering a wireless power receiver to a wireless power network corresponding to the wireless power transmitter;
   applying a charging power for charging the wireless power receiver to a resonator of the wireless power transmitter;
   detecting a change of magnitude of power applied to the resonator;
   detecting that a communication unit of the wireless power transmitter fails to receive a communication signal from the wireless power receiver a predetermined time; and
   in response to detecting the change of the magnitude of power applied to the resonator and that the communication unit fails to receive the communication signal from the wireless power receiver in the predetermined time, removing the wireless power receiver from the wireless power network.

5. The control method of claim 4, further comprising applying, to the resonator, a detecting power for detecting another load change caused by a placement of an object, when no wireless power receivers remain registered to the wireless power network, after removing the wireless power receiver from the wireless power network.

6. The control method of claim 4, further comprising adjusting an amount of the charging power applied to the resonator, in response to removing the wireless power receiver from the wireless power network.

\* \* \* \* \*

UNITED STATES PATENT AND TRADEMARK OFFICE
CERTIFICATE OF CORRECTION

PATENT NO.         : 10,312,696 B2
APPLICATION NO.    : 15/707434
DATED              : June 4, 2019
INVENTOR(S)        : Kyung-Woo Lee et al.

Page 1 of 1

It is certified that error appears in the above-identified patent and that said Letters Patent is hereby corrected as shown below:

In the Claims

In Column 26, Claim 1, Line 14:
"receiver in a predetermined time, and"
Should be:
-- receiver within a predetermined time, and --

In Column 26, Claim 1, Line 18:
"tion signal from the wireless power receiver in the"
Should be:
-- tion signal from the wireless power receiver within the --

In Column 26, Claim 4, Line 13:
"from the wireless power receiver a predetermined time;"
Should be:
-- from the wireless power receiver within a predetermined time; --

In Column 26, Claim 4, Line 18:
"from the wireless power receiver in the predetermined"
Should be:
-- from the wireless power receiver within the predetermined --

Signed and Sealed this
Second Day of July, 2019

Andrei Iancu
*Director of the United States Patent and Trademark Office*